US012131354B2

(12) United States Patent
Huh et al.

(10) Patent No.: US 12,131,354 B2
(45) Date of Patent: Oct. 29, 2024

(54) METHOD FOR PROVIDING INFORMATION BASED ENTRY TRIGGER, APPLICATION SYSTEM, USER TERMINAL, AND APPLICATION IMPLEMENTING THE SAME

(71) Applicant: KAKAO CORP., Jeju-si (KR)

(72) Inventors: Young Jin Huh, Seongnam-si (KR); Sung Yong Chang, Seongnam-si (KR); Sook Young Lee, Seongnam-si (KR); Jisoo Hwang, Yongin-si (KR); Hye Ryeon Lee, Yongin-si (KR); Seon Hwa Kim, Seongnam-si (KR); Younghae Lee, Seoul (KR); Jin Hwan Kim, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 18/088,972

(22) Filed: Dec. 27, 2022

(65) Prior Publication Data

US 2023/0214886 A1    Jul. 6, 2023

(30) Foreign Application Priority Data

Dec. 30, 2021 (KR) .......... 10-2021-0192259
Dec. 30, 2021 (KR) .......... 10-2021-0192943

(51) Int. Cl.
G06Q 30/0241    (2023.01)
G06Q 30/0251    (2023.01)
H04L 12/18      (2006.01)
H04L 51/02      (2022.01)
H04L 51/04      (2022.01)

(52) U.S. Cl.
CPC ..... *G06Q 30/0277* (2013.01); *G06Q 30/0267* (2013.01); *H04L 12/1813* (2013.01); *H04L 12/1822* (2013.01); *H04L 51/02* (2013.01); *H04L 51/04* (2013.01)

(58) Field of Classification Search
CPC ............ G06Q 30/0277; G06Q 30/0267; H04L 12/1813; H04L 12/1822; H04L 51/02; H04L 51/04
See application file for complete search history.

(56) References Cited

U.S. PATENT DOCUMENTS

2008/0091692 A1*  4/2008  Keith ................. G06F 16/958
2018/0103073 A1*  4/2018  Rosenberg .......... H04L 61/4555
(Continued)

FOREIGN PATENT DOCUMENTS

JP    2003-58482     2/2003
JP    2018-506793    3/2018
(Continued)

OTHER PUBLICATIONS

Da-jung Kim et al., NPL—("Dwelling Places in KakaoTalk: Understanding the Roles and Meanings of Chatrooms in Mobile Instant Messengers" Published 2015—pp. 775-784 (Year: 2015).*

*Primary Examiner* — Quoc A Tran
(74) *Attorney, Agent, or Firm* — LEX IP MEISTER, PLLC

(57) ABSTRACT

An operation method of an application system includes receiving a chat room-entry event notifying that a user enters the chat room from a terminal in which an application is installed, generating an entry trigger based on the chat room enter event, and providing user context suitable information inferred based on a user key included in the entry trigger to the chat room.

16 Claims, 20 Drawing Sheets

(56) References Cited

U.S. PATENT DOCUMENTS

2020/0186576 A1* 6/2020 Gopal .................. H04L 65/403
2021/0350299 A1* 11/2021 Hashimoto ...... G06Q 10/06311
2021/0352120 A1* 11/2021 Masi .................... H04L 67/025

FOREIGN PATENT DOCUMENTS

| | | |
|---|---|---|
| JP | 2019-191764 | 10/2019 |
| JP | 2019-527875 | 10/2019 |
| JP | 2021-2341 | 1/2021 |
| JP | 2021-108055 | 7/2021 |
| JP | 2021-177297 | 11/2021 |
| KR | 10-2010-0095205 | 8/2010 |
| KR | 10-2010-0117944 | 11/2010 |
| KR | 10-2011-0036008 | 4/2011 |
| KR | 10-2015-0113299 | 10/2015 |
| KR | 10-2018-0003324 | 1/2018 |
| KR | 10-2018-0038819 | 4/2018 |
| KR | 10-2019-0139773 | 12/2019 |
| KR | 10-2021-0115897 | 9/2021 |
| KR | 10-2320486 | 11/2021 |

* cited by examiner

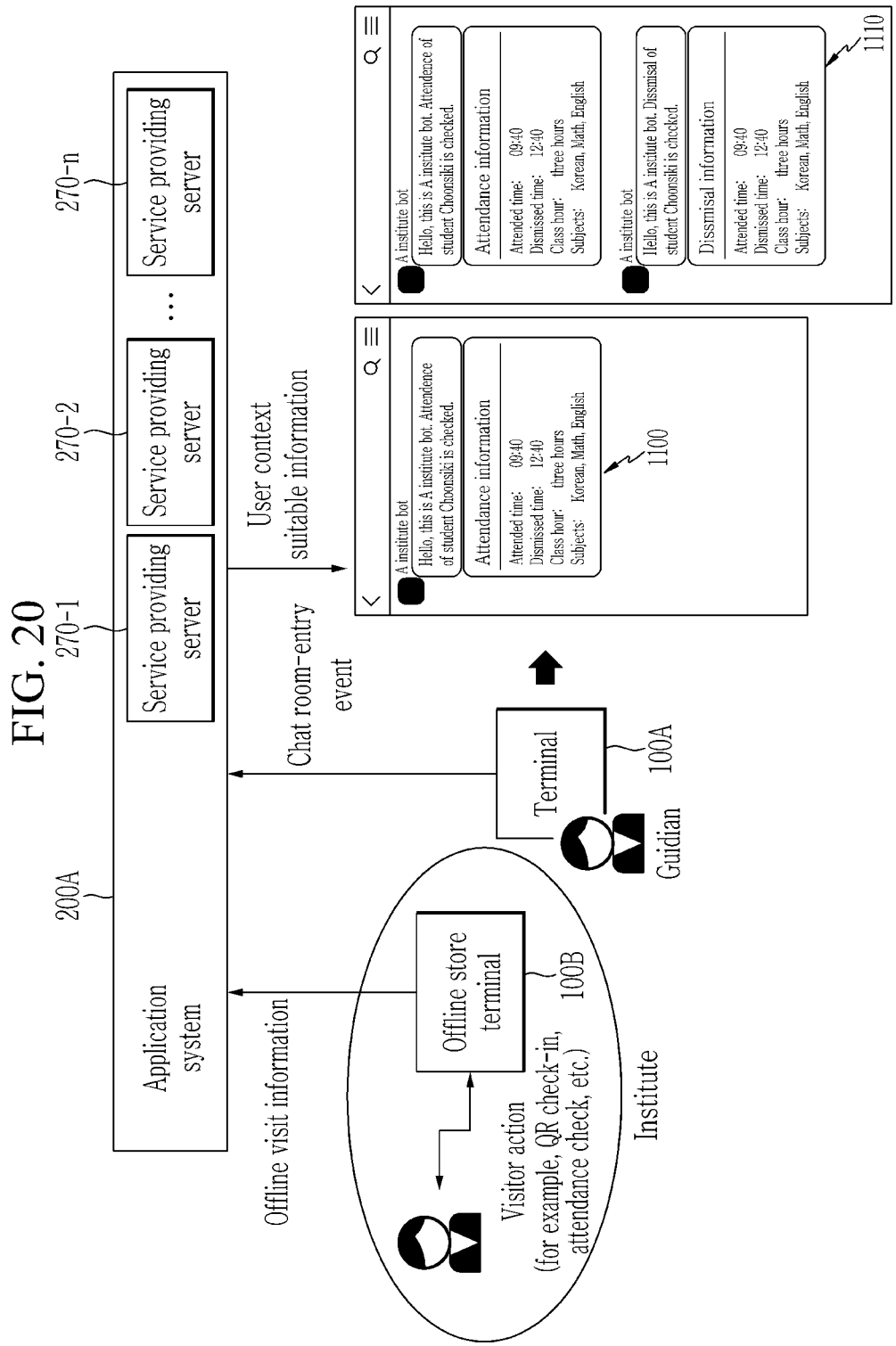

METHOD FOR PROVIDING INFORMATION BASED ENTRY TRIGGER, APPLICATION SYSTEM, USER TERMINAL, AND APPLICATION IMPLEMENTING THE SAME

CROSS-REFERENCE TO RELATED APPLICATION

This application claims priority to and the benefit of Korean Patent Application No. 10-2021-0192259 filed in the Korean Intellectual Property Office on Dec. 30, 2021, and Korean Patent Application No. 10-2021-0192943 filed in the Korean Intellectual Property Office on Dec. 30, 2021, the entire contents of which are incorporated herein by reference.

BACKGROUND OF THE INVENTION

(a) Field

The present disclosure relates to an entry trigger.

(b) Description of the Related Art

Users open channels for business in applications such as Kakaotalk and provide contents such as their own business information, brand news, promotions, and notices to customers.

Customers check messages through chat rooms of the channels and the checking timings may be different for every customer. Accordingly, some customer checks the message by opening the chat room long after the user sent the message so that an event period of the message may have passed or the situation may be different from the time of sending the message. As described above, even though the customer opens the chat room to check the received message, due to invalid information at the time of entry, the customer may leave the chat room without taking an additional action.

Due to the time difference between a message sending time and a message checking time, the message provided to the customer becomes meaningless and the customer may neglect to check the message by recognizing the message sent from the channel as an unnecessary advertising message.

The above information disclosed in this Background section is only for enhancement of understanding of the background of the invention, and therefore it may contain information that does not form the prior art that is already known in this country to a person of ordinary skill in the art.

SUMMARY

The present invention has been made in an effort to provide a method for providing information based on an entry trigger, an application system, a user terminal, and an application implementing the same.

The present disclosure provides a method for extracting information suitable for a user's situation based on an entry trigger occurred at a time when a user enters a chat room to provide the information to the chat room.

The present disclosure provides a method for providing online-offline connected information using an entry trigger, an application system, a user terminal, and an application implementing the same.

The present disclosure provides a method for extracting information suitable for a user at a time when the user enters a chat room based on visit information occurred in an offline place to provide the information to the chat room.

An operation method of an application system according to an exemplary embodiment includes receiving a chat room-entry event notifying that a user enters the chat room from a terminal in which an application is installed, generating an entry trigger based on the chat room enter event, and providing user context suitable information inferred based on a user key included in the entry trigger to the chat room.

In the generating of an entry trigger, the entry trigger for the chat room-entry event is variably generated according to trigger policy information.

The trigger policy information includes at least one of whether to use an entry trigger, whether it is an entry trigger operation time, whether a user subscribed to a channel, and whether cooltime has elapsed.

The entry trigger further includes at least one of channel information that opens the chat room, whether it is a first visit of the chat room, chat room enter time information of the user, and chatbot information.

The user context suitable information may be extracted by an inference logic at a time when the entry trigger is generated.

The user context suitable information is differently provided according to a user's chat room entering time.

A chatbot connected to the chat room provides a message including the user context suitable information to the chat room.

In the providing to the chat room, offline visit information is checked based on a user key included in the entry trigger and user context suitable information inferred based on the offline visit information is provided to the chat room.

In the providing to the chat room, the user context suitable information is determined in consideration of a time difference of a recent offline visit time and an entry trigger generating time.

According to an exemplary embodiment, an operation method that a terminal in which an application is installed interworks with an application system includes providing a chat room-entry event in which a user enters a chat room provided by the application to the application system and displaying a message received from the application system in the chat room, and the message includes information inferred using an entry trigger generated based on the chat room-entry event.

The message is displayed in the chat room before receiving a user inquiry in the chat room.

The message includes user context suitable information extracted through an inference logic at a time when the entry trigger is generated.

The formation included in the message is differently provided according to a time when the user enters the chat room.

In the providing to the application system, a chat room entry address is extracted by scanning a chat room-entry code located in an offline place and the user entry information is provided to the application system by calling the chat room entry address.

According to an exemplary embodiment, an application system includes a bot server that provides a chatbot transmitting a message to a chat room and generates an entry trigger when a chat room-entry event notifying that the user enters the chat room is received, and a service providing server that receives the entry trigger, infers user context suitable information based on a user key included in the entry trigger, and interworks with the bot server to provide the user context suitable information to the chat room.

The bot server variably generates an entry trigger for the chat room-entry event according to trigger policy information.

The trigger policy information includes at least one of whether to use an entry trigger, whether it is an entry trigger operation time, whether a user subscribed to a channel, and whether cooltime has elapsed.

The entry trigger further includes at least one of channel information that opens the chat room, whether it is a first visit of the chat room, chat room enter time information of the user, and chatbot information.

The service providing server infers user context suitable information at the present time at which the entry trigger is generated, based on an inference logic.

When the entry trigger is received, the service providing server checks offline visit information using position reference information included in the entry trigger and provides user context suitable information inferred based on the offline visit information to the chat room by interworking with the bot server.

According to the present disclosure, the user opens a channel chat room at a time when the user wants to get information to get useful information suitable for the user's current situation at the present time.

According to the present disclosure, a channel operator provides useful information to the user based on visit information collected through online or offline to increase user's satisfaction and actively communicate with the customers through a channel.

According to the present disclosure, the channel operator does not miss a user who enters the chat room with interest and sends timely messages to induce use of various services provided by the channel.

BRIEF DESCRIPTION OF THE DRAWINGS

FIGS. 15 to 20 are examples of information suitable for user context based on offline visit information according to another exemplary embodiment.

DETAILED DESCRIPTION OF THE EMBODIMENTS

Figure 1:
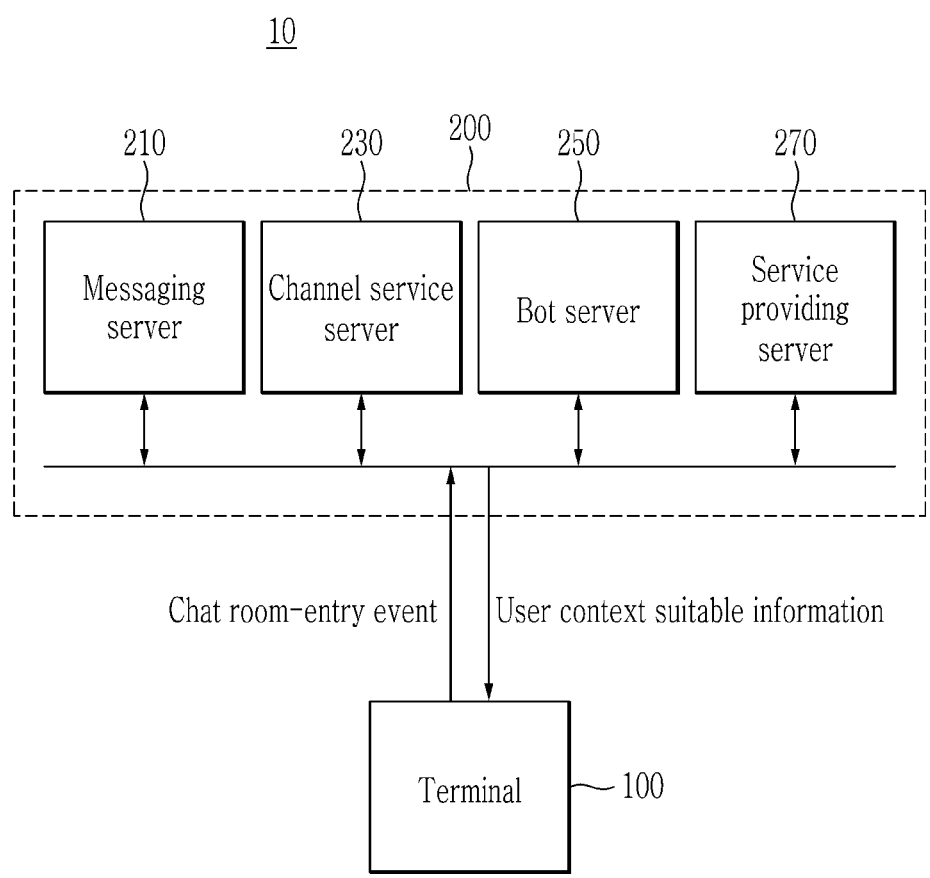
FIG. 1 is a schematic diagram of an information providing system according to an exemplary embodiment.

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

A server may include at least one processor, a memory which loads a computer program performed by the processor, a storage device which stores the computer program and various data, and a communication interface. In addition, the server may further include various configurations. The processor is a device which controls an operation of the server and may be various types of processors which process instructions included in the computer program, and for example, may be configured to include at least one of a central processing unit (CPU), a micro processor unit (MPU), a micro controller unit (MCU), a graphic processing unit (GPU), or arbitrary type of processor well known in the art of the present disclosure. The memory stores various data, instructions and/or information. The memory loads the computer program from the storage device to allow the instructions described to execute the operation of the present disclosure to be processed by the processor. The memory may be, for example, a read only memory (ROM) or a random access memory (RAM). The storage device may non-temporarily store the computer program and various data. The storage device may be configured to include non-volatile memories such as a read only memory (ROM), an erasable programmable ROM (EPROM), an electrically erasable programmable ROM (EEPROM), or a flash memory, a hard disk, a detachable disk, or an arbitrary type of computer readable recording medium well known in the art of the present disclosure. The communication interface may be a wired/wireless communication module which supports wired/wireless communication. The computer program includes instructions executed by a processor and is stored in a non-transitory computer readable storage medium and the instructions causes the processor to execute the operation of the present disclosure.

The terminal includes applications/programs which are software stored in the computer readable storage medium and hardware such as a processor, a memory, a display, or a communication module. The processor cooperates with the hardwares to drive the application. The display displays a user interface screen provided by the application, receives a user input, and for example, receives a touch input. The communication module communicates with the server via a communication network. The terminal may be implemented in various forms and the mobile terminal is described as an example, but may be implemented as a pad type terminal such as a smart pad, various computers such as a laptop computer, wearable devices, or TV terminals.

The application is software stored in the computer readable storage meium and includes instructions and data which execute the operation of the present disclosure. The application is installed in the terminal, executed in the terminal, and communicates with a specified server through a communication network.

Procedures or orders which have been described with reference to the drawing specifically describe on exemplary embodiment so that depending on the design, the procedures or orders may be changed or modified.

FIG. 1 is a schematic diagram of an information providing system according to an exemplary embodiment.

Referring to FIG. 1, the information providing system 10 includes a terminal 100 in which an application is installed and an application system 200 which provides information to the terminal 100 based on an entry trigger generated when the user enters a chat room. The application may be an instant messaging application. The application may be implemented by a software module which provides various services including an instant messaging service which provides chat rooms.

When a chat room provided from the application is open on a screen, the terminal 100 transmits a chat room-entry event notifying the chat room entry of the user to the application system 200. Here, the chat room may be a chat room (channel chat room) of a channel open to provide various information to customers. A channel operator may transmit various information such as advertisement or notices to a chat room with customers. The customer may be a subscriber or a non-subscriber of the channel.

The application system 200 receives the chat room-entry event and generates an entry trigger based on the chat room-entry event. The application system 200 extracts user context suitable information suitable for user's context based on the chat room entry trigger generated at a time when the user enters the chat room and provides the user xontext suitable information to the chat room. A chatbot connected to the chat room provides a message including the user context suitable information to the chat room. Here, the user context suitable information collectively refers to information inferred for the user at a timing when the entry trigger occurs and information included in the user context suitable information may be determined in various forms by an inference logic. For example, the user context suitable information includes information required for the user at a timing when the entry trigger occurs, user's information of interest, and information that the user wants to know.

The application system 200 may be configured in various forms and for example, includes a messaging server 210, a channel service server 230, a bot server 250, and a service providing server 270. A plurality of service providing servers 270 may be provided. The service providing server 270 may be a third-party server operated by a channel through which the chat room is open.

The messaging server 210 provides a chat room based instant messaging service. When the chat room is open in the terminal 100, the messaging server 210 receives a chat room-entry event and provides a chat room screen. The messaging server 210 provides a message to a chat room of the terminal 100. Here, when the messaging server 210 receives the chat room enter event, the messaging server 210 transmits the chat room-entry event to the channel service server 230.

The channel service server 230 interworks with the messaging server 210 to transmit a message to the channel chat room and receive a message input from the channel chat room. Further, the channel service server 230 automatically transmits a message to the channel chat room by means of a chatbot provided by the bot server 250. For this operation of the chatbot, the channel service server 230 transmits the chat room-entry event to the bot server 250.

The bot server 250 provides a chatbot which transmits a message to the channel chat room. The bot server 250 receives a user inquiry input from the channel chat room and extracts a response corresponding to the user inquiry to transmit the response to the channel chat room. In this case, the bot server 250 may be interworked with the service providing server 270 to preemptively transmit the message to the channel chat room, even before receiving the user inquiry. To this end, the bot server 250 receives the chat room-entry event generated by the user's chat room entry and generates an entry trigger based on the chat room-entry event.

The bot server 250 determines a service providing server 270 to which the entry trigger is transmitted and transmits the entry trigger to the determined service providing server 270. The bot server 250 calls the URL of the service providing server 270 and transmits an entry trigger including various reference information to a request payload.

The entry trigger includes a user key that enters the chat room. The user key is user identification information and is configured by at least one user identification information shared in the application system 200. The entry trigger may include channel information that opens the channel chat room. The entry trigger includes whether to be first visit to the chat room, time information that the user enters the chat room (enter time), and chatbot information. The entry trigger includes message information (a message type and a message sending time) which is previously sent to the user. In addition, the entry trigger may include various reference information used by the service providing server 270 to extract information suitable for the entry trigger.

The bot server 250 variably generates an entry trigger for the chat room-entry event according to trigger policy information. The trigger policy information includes conditions for checking whether to use the entry trigger, whether it is an entry trigger operation time, whether a user subscribes a channel, whether a cooltime has elapsed, and whether it is a no-advertising time. The trigger policy information is set on a bot setting screen.

Whether to use the entry trigger is a condition to determine whether the use of the entry trigger is set in the channel, by a channel operator. The bot server 250 generates an entry trigger for a channel set to use the entry trigger.

Whether it is the entry trigger operation time is a condition to determine whether it is a time set to generate the entry trigger. The bot server 250 generates an entry trigger not all the time, but only at an entry trigger operation time.

Whether the user subscribes a channel is a condition to determine whether the user who transmits a chat room-entry event is a channel subscriber. When the service providing server 270 provides entry trigger based information only to the channel subscriber, the bot server 250 interworks with a channel service server (not illustrated) to check whether the user who transmits the chat room-entry event is a channel subscriber and generates an entry trigger. If the service providing server 270 provides the entry trigger based information also to the unsubscriber of the channel, the bot server 250 may not apply a policy of whether the user subscribes a channel.

Whether the cooltime has elapsed is a condition to determine whether a predetermined time (cooltime) has elapsed after transmitting a final message to the chat room and a setting that a new message is not transmitted during the cooltime. Whenever the user enters the chat room, in order to prevent a message from being frequently provided or the same message from being provided, the bot server 250 sets a predetermined time from a reference time as a cooltime and generates an entry trigger for the chat room-entry event for which the cooltime has elapsed. The cooltime may be set to be default or set by a channel operator.

Whether it is a no advertising time is a condition to determine whether it is a time set not to issue advertisement information. When the bot server 250 receives the chat room entry event during a no-advertising time, the bot server may not generate the entry trigger.

The service providing server 270 receives the entry trigger from the bot server 250. The service providing server 270 infers user context suitable information such as information necessary for a user at the present time, information of interest of a user, or information that the user wants to know, based on the inference logic. The inference logic may extract user context suitable information according to a service flow provided from the channel, a user activity history, user related state information, natural environment information such as weather, or social environment information and be designed in various forms for every connected channel. For example, the user context suitable information may be variety, such as visit greeting information, reservation information, payment information, delivery information, refund processing information, guide information, realtime information, or recommendation information.

The service providing server 270 interworks with the bot server 250 to provide the inferred user context suitable information to the chat room of the terminal 100. The user context suitable information may be displayed on a chat room of the terminal 100 by means of the bot server 250, the channel service server 230, and the messaging server 210.

A method for providing user context suitable information for the entry trigger by the bot server 250 may be designed in various forms according to the bot. For example, the service providing server 270 provides event blocks including user context suitable information to the bot server 250. Alternatively, event blocks which provide user context suitable information are stored in the bot server 250 and the service providing server 270 selects an event block. That is, the service providing server 270 calls an event API of an event block corresponding to the determined user context suitable information. In the meantime, when the event block corresponding to user context suitable information is connected to a skill server, the bot server 250 calls the skill server to receive the user context suitable information. The skill server provides user context suitable information to be displayed in the message to the bot server 250. Here, the skill server is a server which receives a skill request from the bot server 250 and analyzes the information included in the skill request to respond and may be included in the service providing server 270.

As described above, unlike the conventional chatbot which responds the utterance of the user to provide an event block, when the user enters the chat room, the bot server 250 provides information suitable for a user's context at a time when the user enters the chat room.

Figure 2:
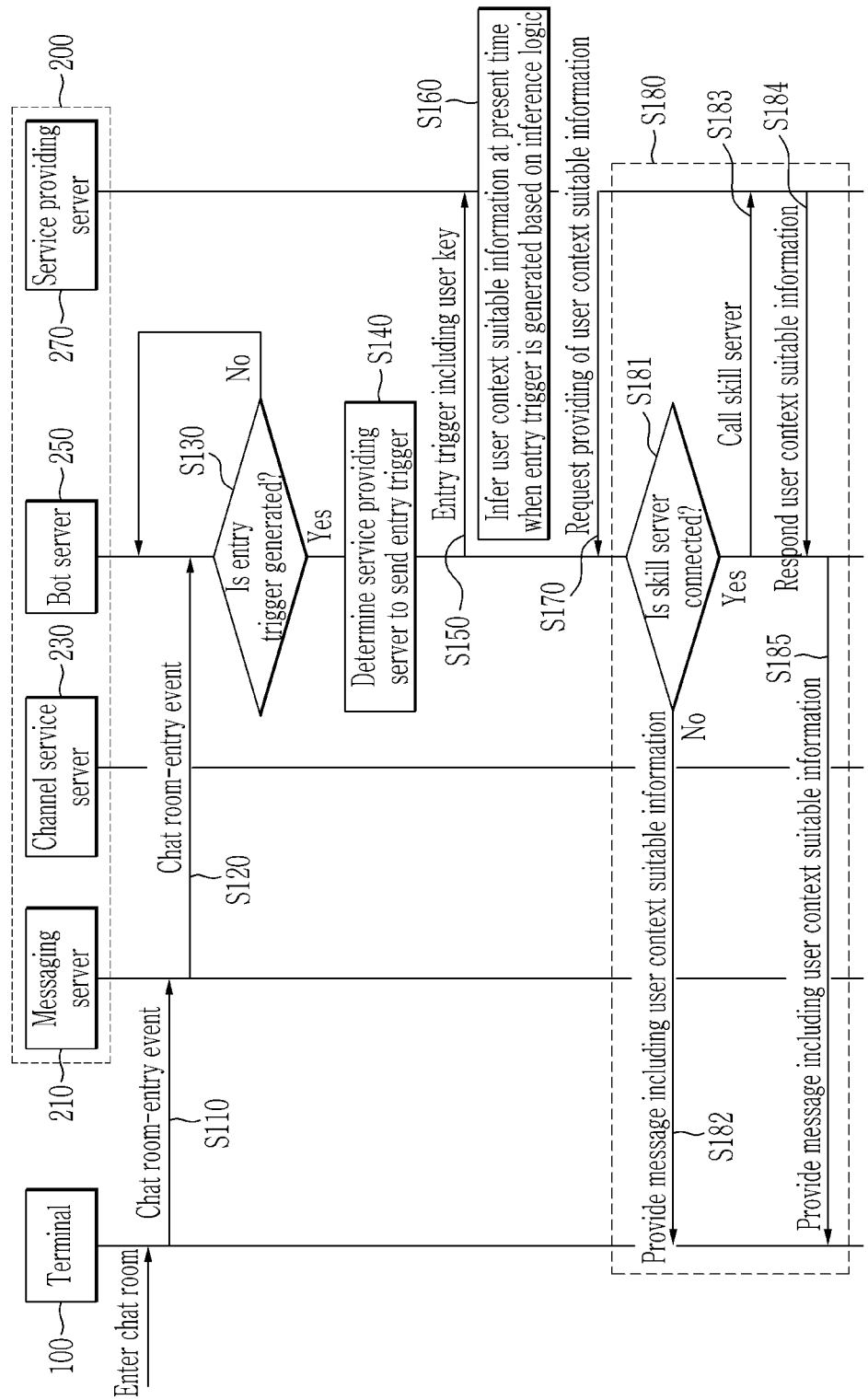
FIG. 2 is a flowchart of an information providing method according to an exemplary embodiment.

FIG. 2 is a flowchart of an information providing method according to an exemplary embodiment.

Referring to FIG. 2, when a user enters the chat room provided by the application, the terminal 100 transmits a chat room-entry event notifying that the chat room entry of the user to the application system 200 in step S110. Here, the chat room may be a channel chat room open to communicate with customers in the channel.

The messaging server 210 of the application system 200 transmits a chat room-entry event to the channel service server 230 and the channel service server 230 to which a bot is connected transmits the chat room-entry event to the bot server 250 in step S120.

The bot server 250 determines whether an entry trigger for the chat room-entry event occurs based on trigger policy information in step S130. The trigger policy information may be set in various forms such as generation of entry trigger if it is a channel chat room set by using the entry trigger, generation of entry trigger if it is an entry trigger operation time, generation of entry trigger if the channel is subscribed by the user, generation of entry trigger if a cooltime has elapsed after transmitting a previous message, and generation of entry trigger if it is not no-advertisement time.

If the chat room-entry event satisfies the trigger policy information, the bot server 250 determines a service providing server 270 to transmit the entry trigger in step $140. The bot server 250 acquires URL of the service providing server 270 related to the chat room-entry event.

The bot server 250 transmits the entry trigger including a user key to the service providing server 270 in step S150. The entry trigger includes reference information such as channel information, whether to be first visit to the chat room, time information that the user enters the chat room (entering time), and chatbot information as well as a user key that enters the chat room.

The service providing server 270 infers user context suitable information at the present time when the entry trigger occurs based on the inference logic in step S160. The inference logic extracts useful information for the user at the present time based on various information such as a service flow, a user activity history, user related state information, various environment information (natural environment information such as weather, time information such as seasons, a month, a day of the week, and social environment information). The user context suitable information may be variety, for example, visit greeting information, reservation information, payment information, delivery information, refund process information, guide information, realtime information, or recommendation information.

The service providing server 270 requests the bot server 250 to provide the inferred user context suitable information in step S170.

The bot server 250 provides a message including user context suitable information to the terminal 100 through a channel service server 230 and a messaging server 210 in step $180.

Here, the method for providing the user context suitable information by the bot server 250 may be designed in various ways according to the chatbot.

For example, the service providing server 270 determines an event block corresponding to user context suitable information and calls an event API of the event block corresponding to the user context suitable information to the bot server 250. The bot server 250 manages event blocks configured by information to be provided to the chat room and the service providing server 270 determines to provide user context suitable information to which event block.

The bot server 250 may determine whether the requested user context suitable information is information connected to the skill server in step S181. That is, the bot server 250 determines whether an event block corresponding to the user context suitable information (for example, reservation information) is to be provided through the response of the skill server. The skill server is a server which receives a skill request from the bot server 250, analyzes the information included in the skill request to respond and in the present disclosure, for the convenience of description, it is assumed to be included in the service providing server 270.

When user context suitable information is information which is not connected to the skill server, the bot server 250 provides a message (event block) corresponding to the user context suitable information to the terminal 100, by means of the channel service server 230 and the messaging server 210 in step S182. For example, if the user context suitable information is "first visit greeting" and an event block of the "first visit greeting" is not connected to the skill event, the bot server 250 may transmit a stored first visit greeting message as a response for the entry trigger without calling the skill server. The message including the user context suitable information may be displayed in the chat room of the terminal 100 as a speech balloon.

If the user context suitable information is information connected to the skill server, the bot server 250 calls the skill server in step S183 to receive the user context suitable information as response in step S184. The skill server responds the user context suitable information as a json format.

The bot server 250 provides a message including the responded user context suitable information to the terminal 100 through the channel service server 230 and the messaging server 210 in step S185. The message including the user context suitable information may be displayed in the chat room of the terminal 100 as speech balloons.

For reference, the method of providing user context suitable information inferred in the service providing server 270 by the bot server 250 is not limited to FIG. 2, but may be designed in various ways.

As described above, when the user enters the chat room, the application system 200 provides information suitable for a user context at that timing to the chat room. Accordingly, the user may not receive unnecessary advertisement message and may not receive a meaningless message due to the difference between a message sending timing and a checked time. Particularly, the user may be immediately provided with the information that the user wants only by entering the channel chat room.

Figure 3:
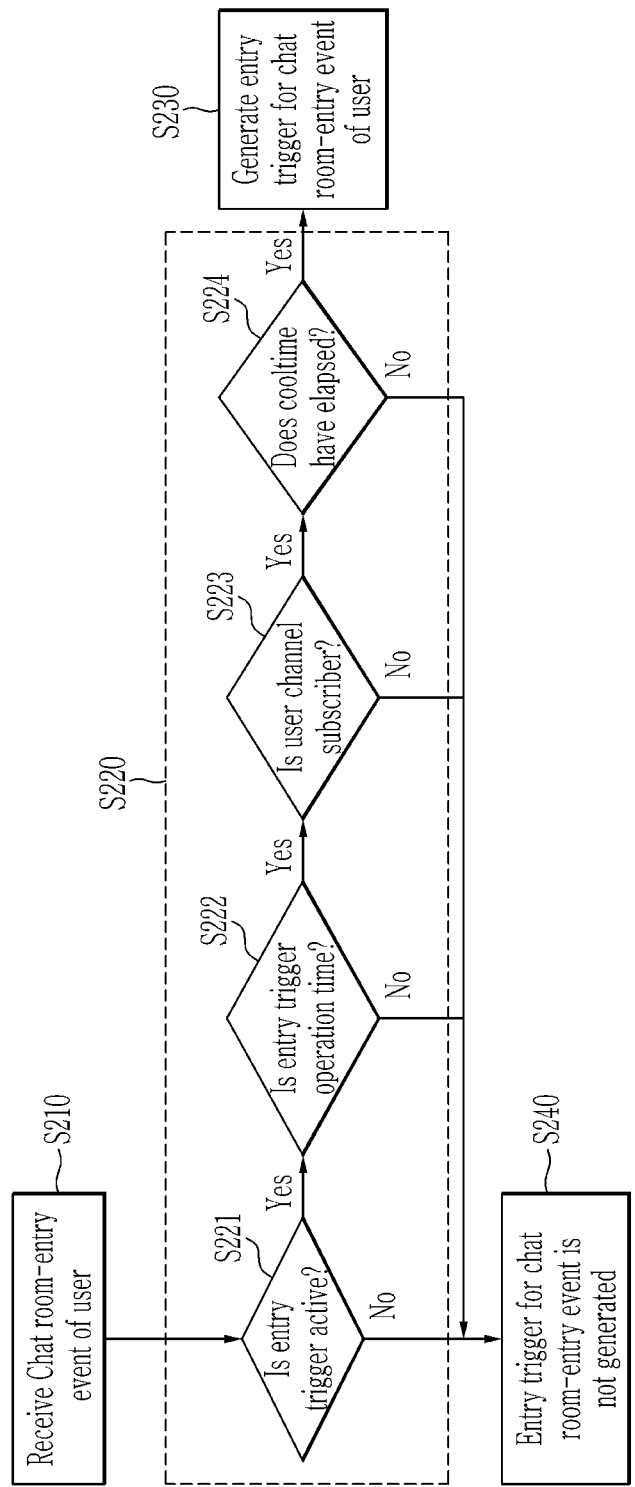
FIG. 3 is a flowchart of a method for generating an entry trigger according to an exemplary embodiment.

FIG. 3 is a flowchart of a method for generating an entry trigger according to an exemplary embodiment.

Referring to FIG. 3, the bot server 250 receives a chat room entry event of the user in step S210.

The bot server 250 determines whether the entry trigger for the chat room-entry event occurs based on trigger policy information in step S220.

When the chat room-entry event satisfies the trigger policy information, the bot server 250 generates an entry trigger for the chat room-entry event in step S230.

When the chat room-entry event does not satisfy the trigger policy information, the bot server 250 does not generate an entry trigger for the chat room-entry event in step S240.

Specifically, the bot server 250 determines whether use of the entry trigger for the channel chat room is active (ON) in step S221 and if the use of the entry trigger is inactive, the bot server may not generate the entry trigger in step S240.

When the use of the entry trigger is active, the bot server 250 determines whether it is an entry trigger operation time in step S222, and if it is not an entry trigger operation time, the bot server 250 does not generate an entry trigger in step S240. For example, a shopping channel operator may set an entry trigger operation time in accordance with a live broadcasting schedule to provide entry trigger based user context suitable information (live broadcast product information) only during a live broadcasting time.

The bot server 250 determines whether the user is a channel subscriber in step S223 and if the user is not a channel subscriber, may not generate the entry trigger in step S240. The channel operator may provide the entry trigger based user context suitable information only to the channel subscriber.

The bot server 250 determines whether the cooltime has elapsed based on a time when the message is sent to the user previously in step S224, and if it is before lapse of the cooltime, may not generate the entry trigger in step S240. The cooltime is a time when the message is not sent for a predetermined time after transmitting a previous message and is set as a default time or set by a channel operator.

In addition, the bot server 250 determines whether it is no-advertisement time and if it is a no advertisement time, the bot server 250 may not generate the entry trigger. Further, a type of the trigger policy information and a determination order which have been described in FIG. 3 may be modified in various ways.

Figure 4:
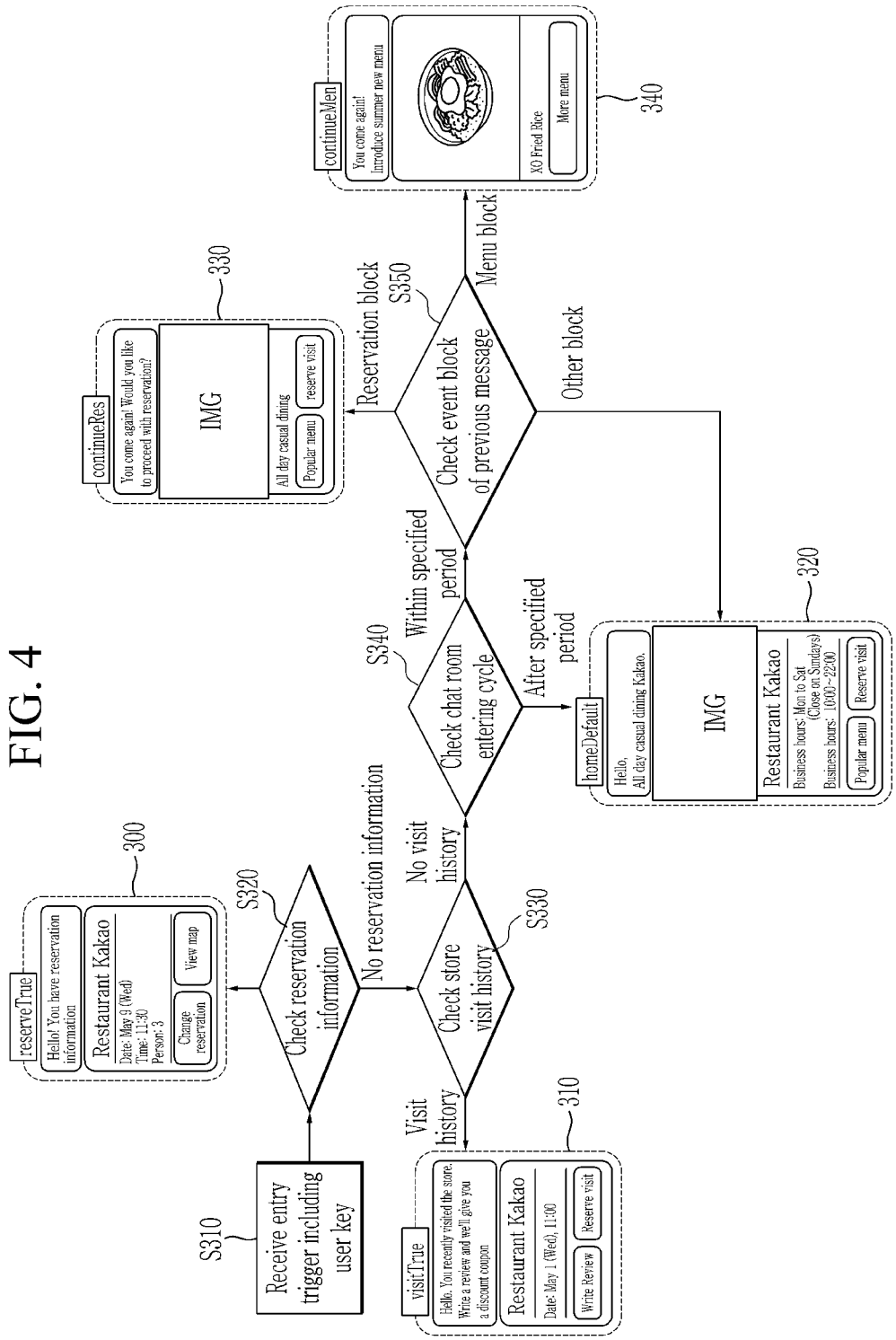
FIG. 4 is an example of a recommendation logic of providing information suitable for user context according to an exemplary embodiment.

FIG. 4 is an example of a recommendation logic of providing information suitable for user context according to an exemplary embodiment.

Referring to FIG. 4, it is assumed that the service providing server 270 is a server related to a restaurant Kakao channel and user context suitable information is provided according to the following inference logic. In this case, the service providing server 270 manages offline information such as restaurant reservation information and store visit information based on customer information (for example, phone numbers and names) which are managed by the restaurant Kakao and provides on/offline connected service therethrough.

The service providing server 270 receives an entry trigger including a user key from a bot server 250 which provides a chatbot of the restaurant Kakao channel in step S310.

The service providing server 270 checks the restaurant reservation information using the user key in step S320. If there is restaurant reservation information mapped to the user key, the service providing server 270 may determine the restaurant reservation information as user context suitable information. The service providing server 270 calls a reserveTrue event block of the bot server 250 to provide a restaurant reservation information message 300 to a channel chat room in step S322.

If there is no restaurant reservation information mapped to the user key, a store visit history within a predetermined period is checked S330. When there is a store visit history within a predetermined period mapped to the user key, the service providing server 270 may determine store review writing or visit reservation as user context suitable information. The service providing server 270 calls the visitTrue event block of the bot server 250 to provide a message 310 available for store review writing or visit reservation to the channel chat room.

When there is no store visit history within a predetermined period, the service providing server 270 may determine a chat room enter cycle in step S340. The service providing server 270 checks data when the message is sent according to the previous entry trigger and determines how long it has been since the user enters the chat room after sending the previous message.

If the user entered the chat room after a predetermined period (for example, seven days) after sending the previous message, the service providing server 270 determines the restaurant information and visit reservation as user context suitable information. The service providing server 270 calls a homeDefault event block of the bot server 250 to check the restaurant information and provide a message 320 available for visit reservation to the channel chat room.

If the user enters the chat room within a predetermined period after sending the previous message, the service providing server 270 checks an event block related to the previous message in step S350.

If the event block related to the previous message is a reservation block, the service providing server 270 calls a continueRES event block of the bot server 250 to provide a message 330 which continues the visit reservation to the channel chat room.

If an event block related to the previous message is a menu block, the service providing server 270 calls a continueMen event block of the bot server 250 to provide a message 340 for checking the menu again to the channel chat room.

If the event block related to the previous message is the other block, the service providing server 270 calls a homeDefault event block of the bot server 250 to check the restaurant information and provides a message 320 available for visit reservation to the channel chat room in step S342.

Next, various user context suitable information which is provided to users who enter the chat room will be described.

FIGS. 5 to 12 are examples of an interface screen which provides information suitable for user context according to an exemplary embodiment.

Referring to FIGS. 5 to 12, a user selects a channel chat room from a chat room list screen 400 provided by the application to enter the chat room. Here, a chat room entering method on the chat room list screen 400 is one example of entering a channel chat room and the user may check the channel chat room through various entry points.

Bt doing this, the application system 200 checks a chat room-entry event occurred in the terminal 100 and provides information suitable for a user context at the present time through a bot connected to the channel chat room. In this case, the user context suitable information is determined by the service providing server 270 of the channel and is selected from various event blocks according to a service flow provided from the channel, natural environment information, such as a user activity history, user related state information, and weather, and social environment information. The user context suitable information may be variety, such as visit greeting information, reservation information, payment information, delivery information, refund process information, guide information, real-time information, and recommendation information.

The terminal 100 displays a message received from the application system 200 on a channel chat room.

Figure 5:
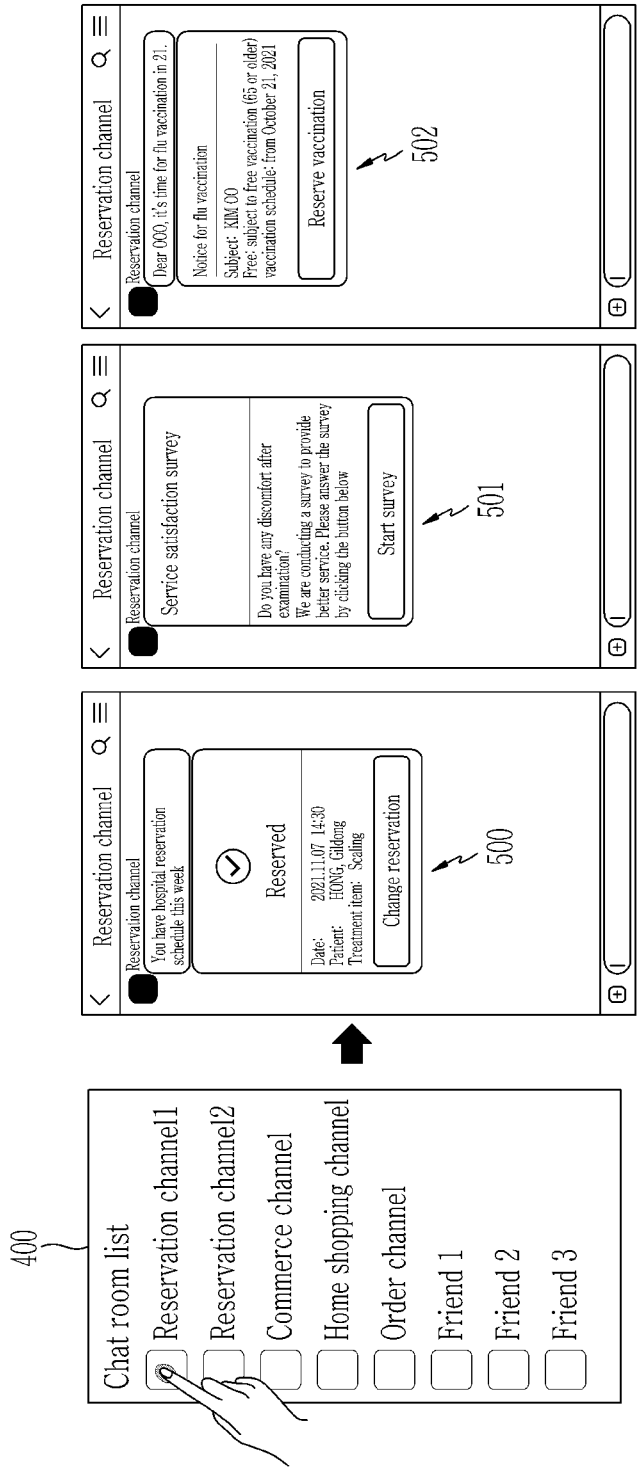
FIGS. 5 to 12 are examples of an interface screen which provides information suitable for user context according to an exemplary embodiment.

Referring to FIG. 5, when the user enters a chat room of a reservation channel 1, the terminal 100 receives a message from the application system 200 and displays the received message on the chat room. To this end, the service providing server 270 of the reservation channel 1 receives the entry trigger of the user from the bot server 250 and checks the user related state information mapped to the user key based on the user key included in the entry trigger.

For example, when there is a hospital reservation schedule mapped to the user key at a timing when the entry trigger occurs, the service providing server 270 determines the hospital reservation schedule as the user context suitable information and provides the hospital reservation schedule message to the chat room through the bot server 250. Accordingly, even though the user does not input a separate user's inquire in the chat room, the user may check the reservation schedule message 500 in the chat room just by entering the chat room. The reservation schedule message 500 includes additional function (for example, reservation change) together with the reservation information.

If a user's state mapped to the user key is a check-up completed state at a time when the entry trigger occurs, the service providing server 270 determines an event which should be issued after the check-up completed state according to a service procedure, for example, a service satisfaction survey as the user context suitable information and provides a service satisfaction survey message to the chat room through the bot server 250. Accordingly, even though the user does not input a separate user's inquiry in the chat room, the service satisfaction survey message 501 is displayed in the chat room and as soon as the user enters the chat room, the user may check the message 501 displayed on the screen to start the survey.

In the meantime, there may be no reservation schedule mapped to the user key at the time when the entry trigger occurs. If so, the service providing server 270 may determine user recommendation information, for example, flu vaccination guide, based on user information (for example, 65 years of age or older) and reservationable services (for example, flu vaccination, or health checkup). The user may check the flu vaccination guide message 502 provided by the bot server 250 in the chat room. As described above, if a user who does not have a reservation schedule enters the chat room of the reservation channel 1, the service providing server 270 infers it as an action for reserving or inquiring through the reservation channel 1, and provides information suitable for user's context inferred based on the inference logic before receiving the user inquiry.

Figure 6:
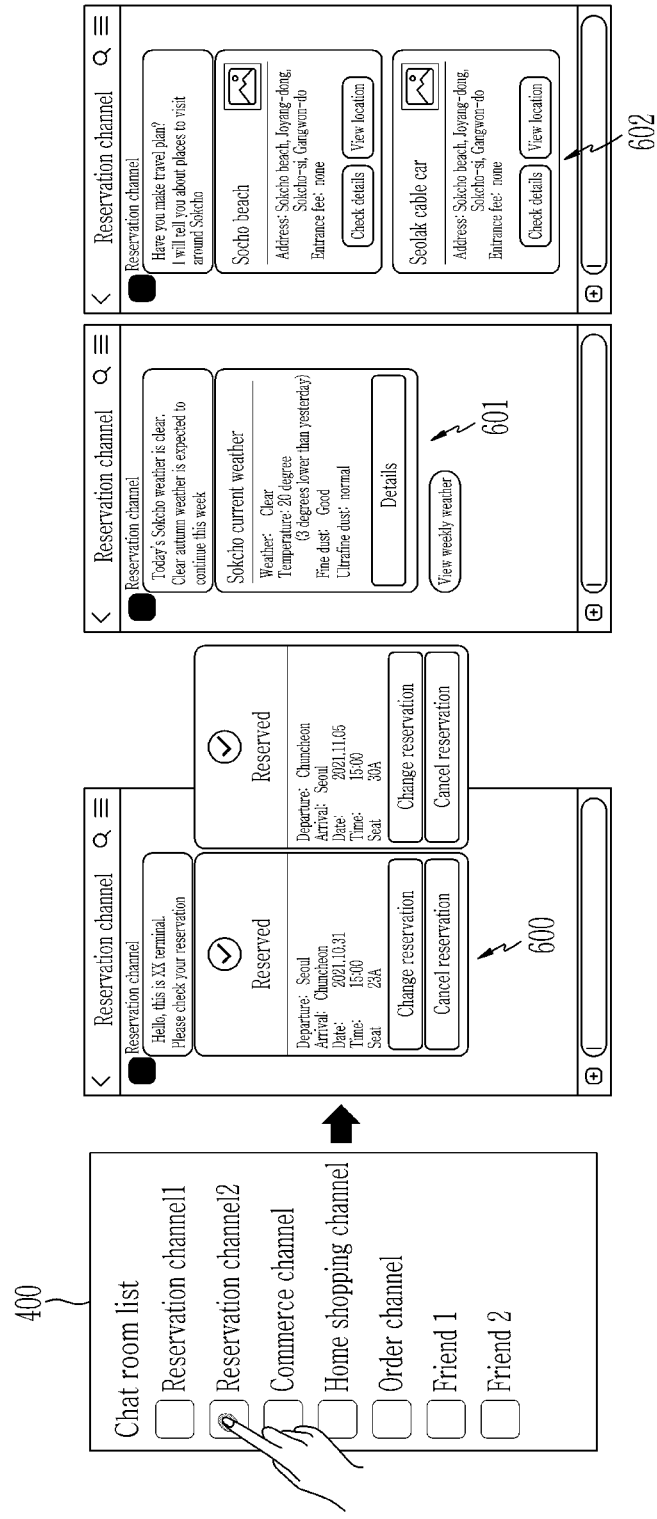
Figure 7:
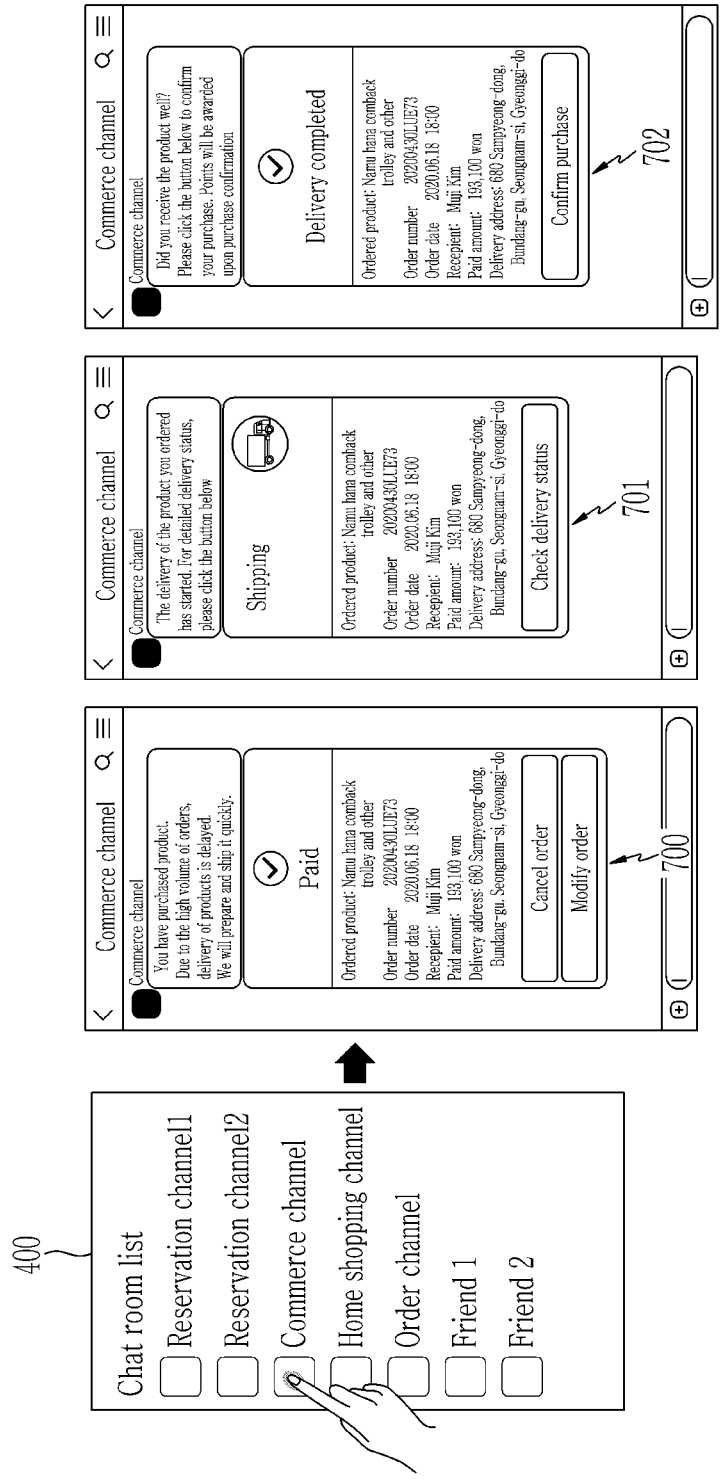
Figure 8:
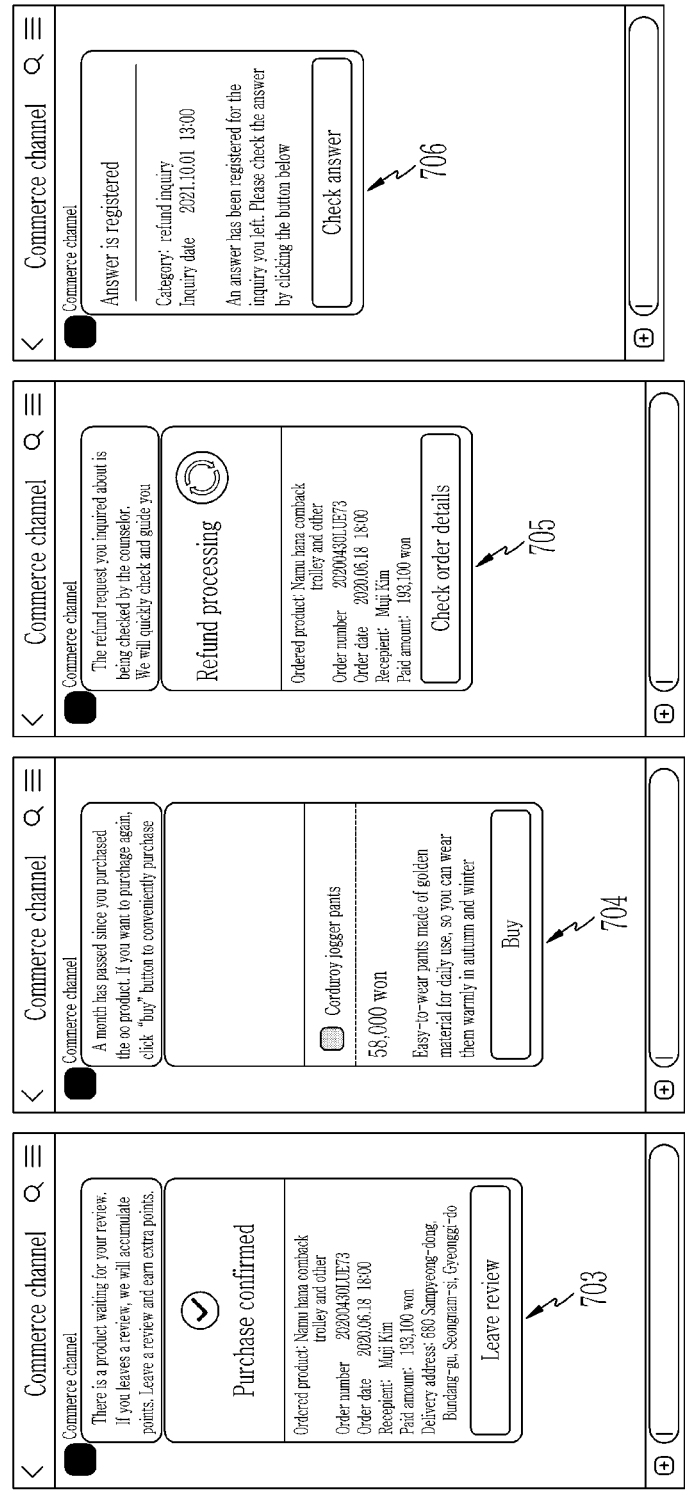
Figure 9:
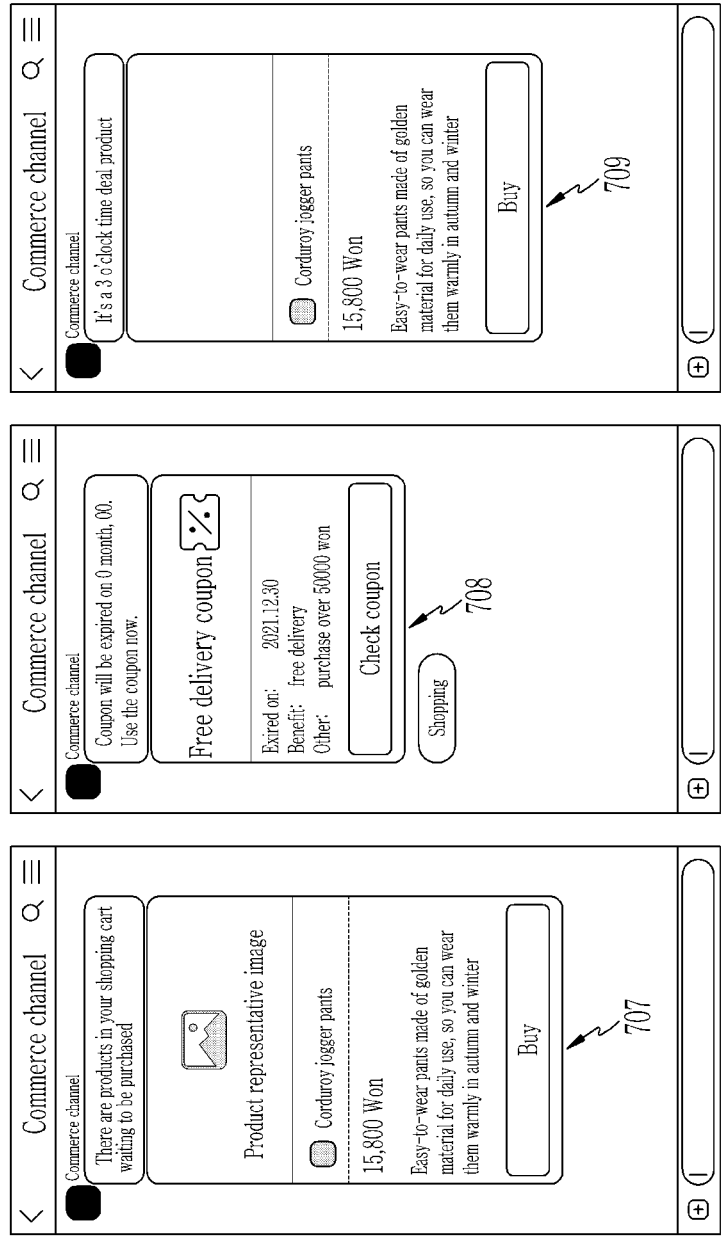
Figure 10:
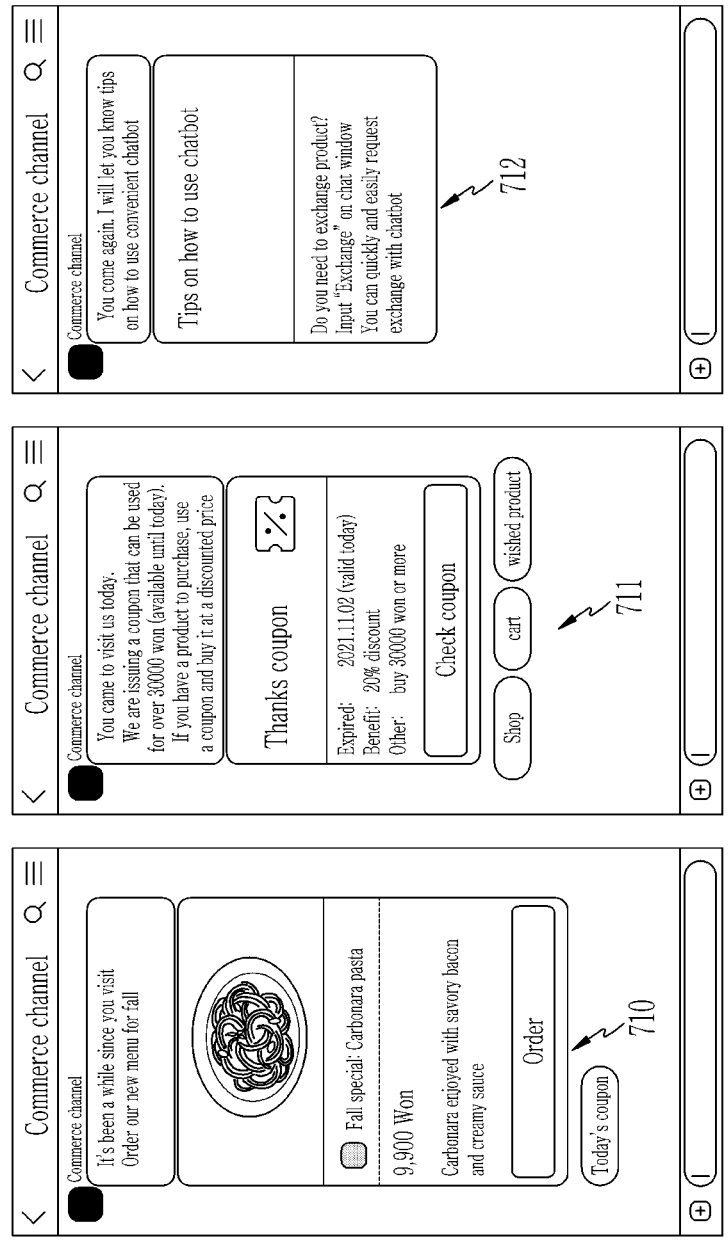

Referring to FIG. 6, when the user enters a chat room of a reservation channel 2, the terminal 100 receives a message from the application system 200 and displays the received message in the chat room. To this end, the service providing server 270 of the reservation channel 2 receives the entry trigger of the user from the bot server 250 and checks the user related state information mapped to the user key based on the user key included in the entry trigger.

For example, when there is express bus reservation information mapped to a user key at a time when the entry trigger occurs, the service providing server 270 determines a reservation schedule guide as the user context suitable information and provides the reservation schedule guide to the chat room through the bot server 250. Accordingly, even though the user does not input a separate user inquiry in the chat room, a message 600 including the express bus reservation information may be displayed in the chat room.

When there is a travel reservation schedule mapped to the user key at a time when the entry trigger occurs, the service providing server 270 determines the reservation information as user context suitable information. Alternatively, the service providing server 270 may determine user recommendation information extracted based on user information (for example, a travel destination and a schedule) and available information (for example, weather and nearby destination information), for example, destination weather/nearby destination as user context suitable information. By doing this, even though a separate user inquiry is not input in the chat room, the user may check a destination weather information message 601 and a nearby destination information message 602 which are immediately displayed as soon as the chat room is open. Here, the destination weather information message 601 and the nearby destination information message 602 are not messages which are transmitted to the chat room before the user opens the chat room, but are messages received after the user opens the chat room.

Referring to FIGS. 7 to 10, when the user enters a chat room of a commerce channel, the terminal 100 receives a message from the application system 200 and displays the received message in the chat room. To this end, the service providing server 270 of the commerce channel receives the entry trigger of the user from the bot server 250 and checks the user related state information mapped to the user key based on the user key included in the entry trigger.

The service providing server 270 determines state information in a purchase procedure as user context suitable information and provides the user context suitable information through the bot server 250. For example, when a user who buys a product from a commerce channel enters the chat room, a payment completion message 700 is displayed on the chat room screen. When the user enters the chat room after a predetermined time from the product purchase, a delivery status message 701 corresponding to a current state of the purchased product is displayed, a delivery completion message 702 is displayed, or a review writing request message 703 is displayed, or re-purchase inquiry message 704 is displayed.

When there is a refund request history of the user for a product which is purchased in the commerce channel, the service providing server 270 requests the bot server 250 to display a refund process guide message 705 or a reply registration message 706 in the chat room in which the user enters.

When there is a product put by the user in a shopping cart of the commerce channel, the service providing server 270 requests the bot server 250 to display a message 707 to induce the purchase of the product in the shopping cart in the chat room in which the user enters.

If the user has a couple available in the commerce channel, the service providing server 270 requests the bot server 250 to display a message 708 guiding the use of the couple in the chat room in which the user enters.

If a real-time event is in progress in the commerce channel at the time when the user enters the chat room, the service providing server 270 requests the bot server 250 to display a real-time event message 709 in the chat room in which the user enters.

In the meantime, the service providing server 270 infers user context suitable information based on a user's chat room visit frequency. The service providing server 270 may determine a chat room visit frequency based on a time difference from a previous entry trigger of the user. For example, when a user enters in the chat room after a long time, the service providing server 270 requests the bot server 250 to display a message 710 including greeting phrase suitable for the visit frequency and recommendation information in a chat room in which the user enters. If a user frequently enters the chat room, the service providing server 270 requests the bot server 250 to display a message 711 including a greeting phrase suitable for the visit frequency and benefit information in the chat room in which the user enters.

The service providing server 270 infers the user context suitable information based on the user's usability in the chat room. For example, even though the user enters the chat room, there is no subsequent action, the service providing server 270 requests the bot server 250 to display a guide message 712 to increase the usability such as a chatbot using method in the chat room.

Figure 11:
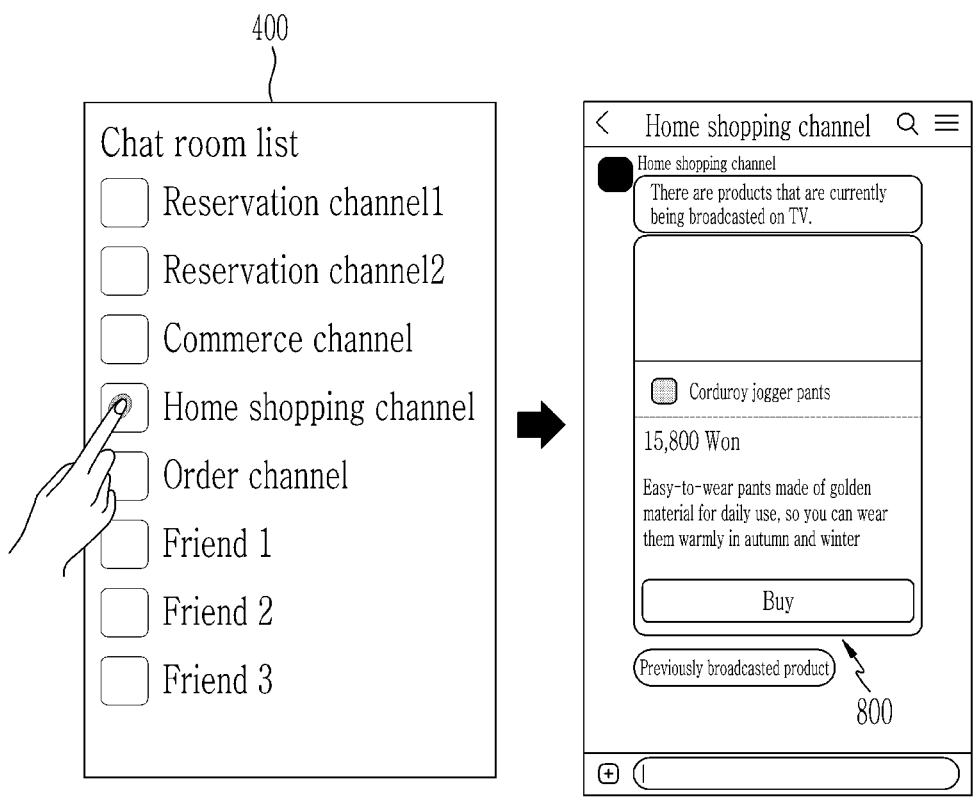

Referring to FIG. 11, when the user enters a chat room of a home shopping channel, the terminal 100 receives a message from the application system 200 and displays the message in the chat room. To this end, when the service providing server 270 of the home shopping channel receives the entry trigger of the user from the bot server 250, the service providing server 270 infers the user context suitable information. In this case, the service providing server 270 interworks with a schedule of the TV home shopping broadcast to determine product information which is on sale in the current TV home shopping broadcast as user context suitable information. By doing this, when the user enters the chat room of the home shopping channel, a product information message 800 which is being broadcast on the TV home shopping is displayed in the chat room. By doing this, if a user who is watching the TV home shopping broadcast is curious about product information which is being broadcast on the TV home shopping, the user just opens the chat room of the home shopping channel to be provided with the information through the chat room.

Figure 12:
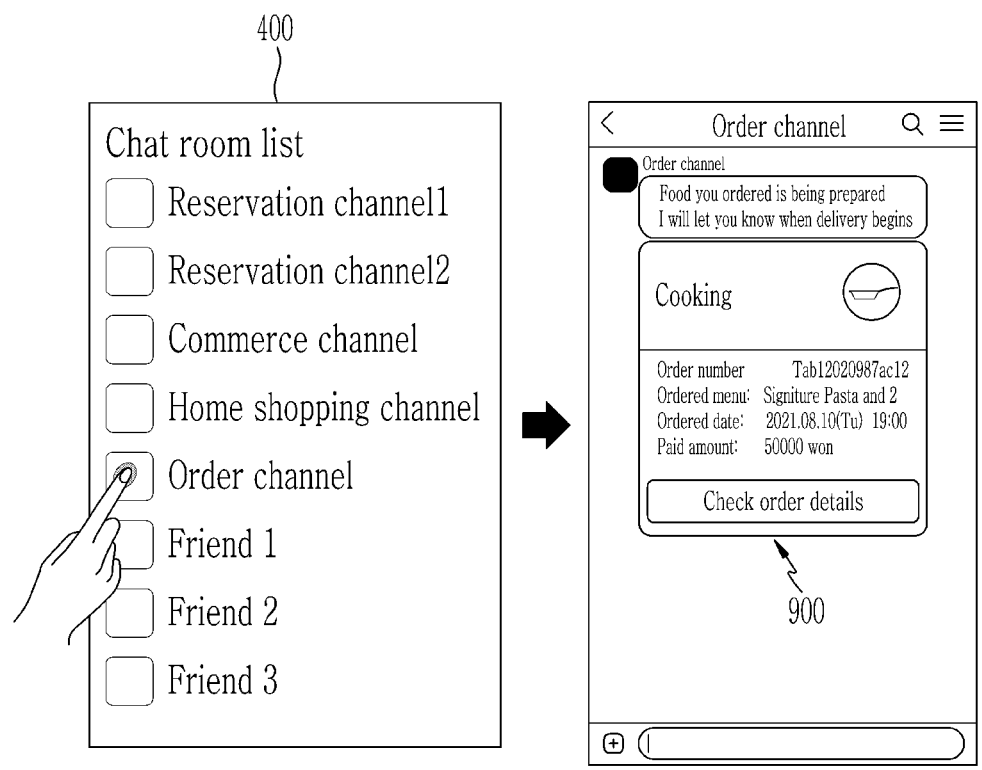

Referring to FIG. 12, if a user enters a chat room of an order channel, the service providing server 270 checks order details based on a user key of the chat room entry trigger, and determines a current order state according to the order details as the user context suitable information. A message 900 representing a current order state may be displayed in the chat room.

If there is no order detail mapped to the user key, a recommended menu determined in the service providing server 270 may be displayed in the chat room.

As described above, when the user enters the chat room, the application system 200 provides information suitable for a user's context at that time to the chat room and provides user context suitable information associated with an offline place based on visit information collected from the offline place. Next, a method for extracting information suitable for a user at a time when the user enters the chat room based on the visit information occurred in the offline place to provide the information to the chat room will be described in detail.

Figure 13:
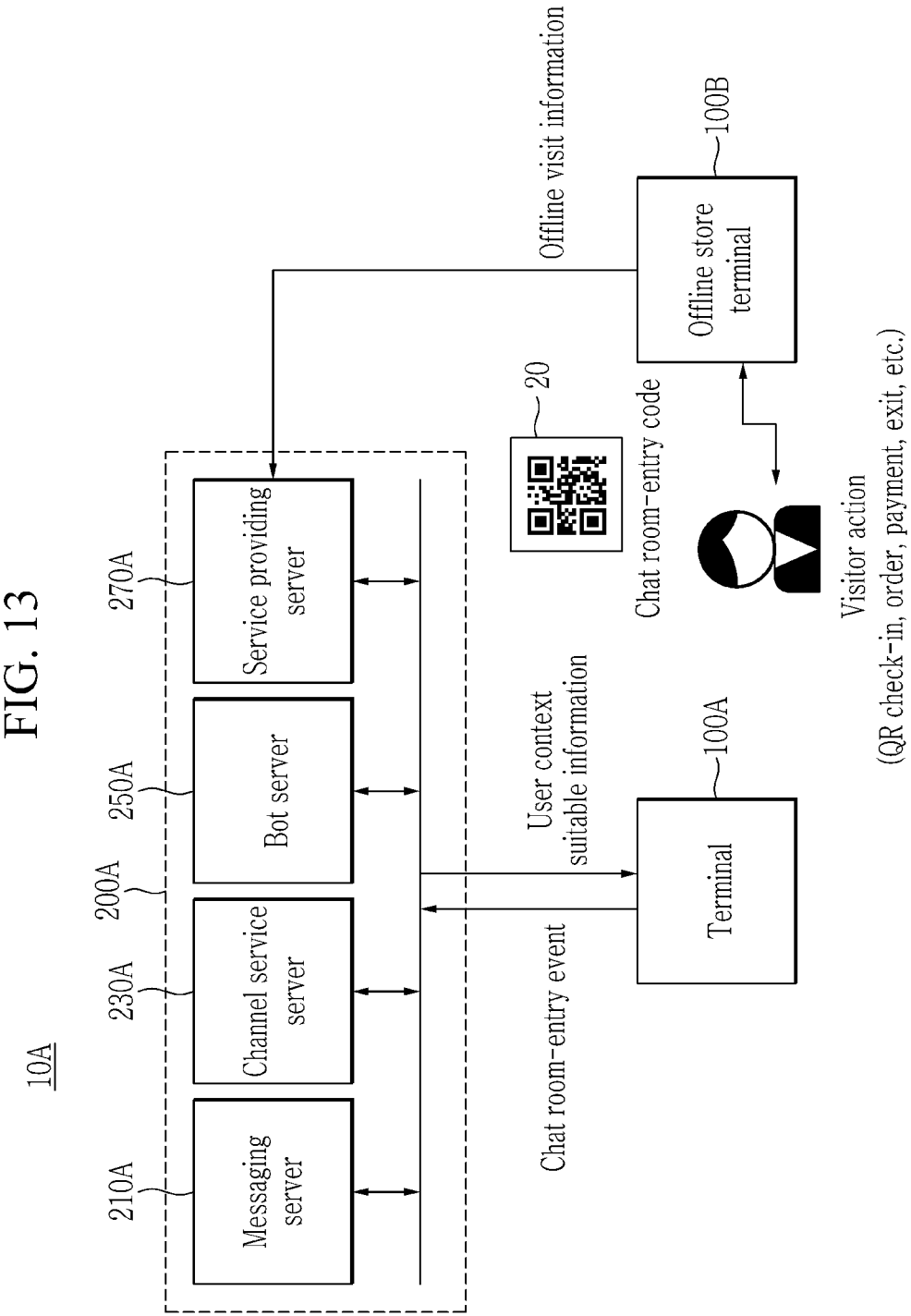
FIG. 13 is a schematic diagram of an information providing system according to another exemplary embodiment.

FIG. 13 is a schematic diagram of an information providing system according to another exemplary embodiment.

Referring to FIG. 13, an information providing system 10A is similar to the information providing system 10 of FIG. 1 and collects offline visit information of a user from an offline store terminal 100B and provides user context suitable information using the information. Accordingly, the contents described with reference to FIGS. 1 to 12 may also be applied to the information providing system 10A and a description will be omitted below.

The information providing system 10A includes a terminal 100A in which an application is installed, an application system 200A which provides information to the terminal 100A based on an entry trigger generated when the user enters a chat room, and an offline store terminal 100B.

The offline store terminal 100B is a terminal which generates offline visit information of a user in the offline place and for example, may be a QR check-in terminal, a POS terminal installed in the store, and a facility entry/exit management terminal. The offline visit information may be generated based on visitor action information such as check-in, order, payment, and check-out. The check-in may be QR check-in, for example. The facility may be variety, such as marts, restaurants, hotels, department stores, airports, terminals, sport centers, educational institutes, or parking lots. In the meantime, a chat room-entry code 20 may be installed in the offline place. The terminal 100A scans the chat room-entry code 20 to enter a chat room at an address included in the chat room entry code 20. That is, when the user scans the chat room-entry code 20 through the terminal 100A, a chat room screen may be displayed on the terminal. The chat room-entry code 20 includes an entry address URL of the chat room related to the offline place and position reference information (referrer) which identifies the offline place may be added to the URL. The chat room-entry code 20 is manufactured as a QR code to be disposed in the offline place.

When a chat room provided from the application is open on a screen, the terminal 100A transmits a chat room-entry event notifying the chat room entry of the user to the application system 200A. The chat room-entry event may be chat room information selected by the user. Here, the chat room may be a chat room (channel chat room) of a channel open to provide various information to the customers. A channel operator may transmit various information such as advertisement or notives to a chat room with the customers. The customer may be a subscriber or a non-subscriber of the channel.

In the meantime, the terminal 100A calls the chat room entry address URL extracted from the chat room-entry code 20 to be provided with a chat room screen of the corresponding address from the application system 200A. In this case, the chat room screen is open on the terminal 100A by the chat room entry address so that the application system 200A considers the called chat room entry address URL a s a chat room-entry event.

As described above, the user may select a desired chat room from a chat room list to enter the chat room or capture the chat room-entry code 20 including the chat room entry address to enter the chat room.

The application system 200A receives the chat room-entry event and generates an entry trigger based on the chat room-entry event. The application system 200A extracts user context suitable information suitable for user's context based on the chat room entry trigger generated at a time when the user enters the chat room and provides the user context suitable information to the chat room. A chatbot connected to the chat room provides a message including the user context suitable information to the chat room. Here, the user context suitable information collectively refers to information inferred for the user at a timing when the entry trigger occurs and information included in the user context suitable information may be determined in various forms by an inference logic. For example, the user context suitable information includes information required for the user at a timing when the entry trigger occurs, user's information of interest, and information that the user wants to know.

The application system 200A may be configured in various forms and for example, includes a messaging server 210A, a channel service server 230A, a bot server 250A, and a service providing server 270A. A plurality of service providing servers 270A may be provided. The service providing server 270A may be a third-party server operated by a channel through which the chat room is open. The service providing server 270A collects visit information from an offline store terminal 100B located in the offline place.

The messaging server 210A provides an instant messaging service based on a chat room. The messaging server 210A receives the chat room-entry event from the terminal 100A and provides a chat room screen. In the meantime, the messaging server 210A allocates the chat room entry address URL for user's chat room enter to the chat room and provides a chat room screen corresponding to the chat room entry address to the terminal 100A that calls the chat room entry address URL. The messaging server 210A provides a message to a chat room of the terminal 100A. Here, when the messaging server 210A receives the chat room enter event, the messaging server 210A transmits the chat room-entry event to the channel service server 230A. The messaging server 210A may include information require to infer the user context suitable information in the chat room-entry event. When the chat room entry address URL is called to enter the chat rom, the chat room-entry event includes position reference information included in the chat room entry address.

The channel service server 230A interworks with the messaging server 210A to transmit a message to the channel chat room and receive a message input from the channel chat room. Further, the channel service server 230A automatically transmits a message to the channel chat room by means of a chatbot provided by the bot server 250A. For this operation of the chatbot, the channel service server 230A transmits the chat room-entry event to the bot server 250A.

The bot server 250A provides a chatbot which transmits a message to the channel chat room. The bot server 250A receives a user inquiry input from the channel chat room and extracts a response corresponding to the user inquiry to transmit the response to the channel chat room. In this case, the bot server 250A may be interworked with the service providing server 270A to preemptively transmit the message to the channel chat room, even before receiving the user inquiry. To this end, the bot server 250A receives the chat room-entry event generated by the user's chat room entry and generates an entry trigger based on the chat room-entry event.

The bot server 250A determines a service providing server 270A to which the entry trigger is transmitted and transmits the entry trigger to the determined service providing server 270A. The bot server 250A calls the URL of the service providing server 270A and transmits an entry trigger including various reference information to a request payload.

The entry trigger includes a user key that enters the chat room. The user key is user identification information and is configured by at least one user identification information shared in the application system 200A. The entry trigger may include channel information that opens the channel chat room. The entry trigger includes whether to be first visit to the chat room, time information that the user enters the chat room (enter time), and chatbot information. The entry trigger includes message information (a message type and a message sending time) which is previously sent to the user. In addition, the entry trigger may include various reference information used by the service providing server 270A to extract information suitable for the entry trigger.

The bot server 250A variably generates an entry trigger for the chat room-entry event according to trigger policy information. The trigger policy information includes conditions for checking whether to use the entry trigger, whether it is an entry trigger operation time, whether a user subscribes a channel, whether a cooltime has elapsed, and whether it is a no-advertising time. The trigger policy information is set on a bot setting screen.

Whether to use the entry trigger is a condition to determine whether the use of the entry trigger is set in the channel, by a channel operator. The bot server 250A generates an entry trigger for a channel set to use the entry trigger.

Whether it is the entry trigger operation time is a condition to determine whether it is a time set to generate the entry trigger. The bot server 250A generates an entry trigger not all the time, but only at an entry trigger operation.

Whether the user subscribes a channel is a condition to determine whether the user who transmits a chat room-entry event is a channel subscriber. When the service providing server 270A provides entry trigger based information only to the channel subscriber, the bot server 250A interworks with a channel service server (not illustrated) to check whether the user who generates the chat room-entry event is a channel subscriber and generates an entry trigger. If the service providing server 270A provides the entry trigger based information also to the unsubscriber of the channel, the bot server 250A may not apply a policy of whether the user subscribes a channel.

Whether the cooltime has elapsed is a condition to determine whether a predetermined time (cooltime) has elapsed after transmitting a final message to the chat room and a setting that a new message is not transmitted during the cooltime. Whenever the user enters the chat room, in order to prevent a message from being frequently provided or the same message from being provided, the bot server 250A sets a predetermined time from a reference time as a cooltime and generates an entry trigger for the chat room-entry event for which the cooltime has elapsed. The cooltime may be set to be default or set by a channel operator.

Whether it is a no advertising time is a condition to determine whether it is a time set not to issue advertisement information. When the bot server 250A receives the chat room entry event during a no-advertising time, the bot server may not generate the entry trigger.

The service providing server 270A collects offline visit information from the offline store terminal 100B located in the offline place and manages customer information (for example, phone numbers and names). By doing this, the service providing server 270A extracts user context suitable information based on the offline visit information. The offline visit information may be stored as user related state information. The offline visit information includes user identification information, a visit time, a visit location, a visit purpose, visitor action information (check in, order, payment, enter, and exit). The check-in methods are variety, and for example, a QR check-in. The user identification information may be variety and for example, personal information such as customer numbers, phone numbers, and names and uniquely issued personal security number.

The service providing server 270A may map and manage the user identification information collected from the offline store terminal 100B and user information (user key) that subscribes the operating channel.

In the meantime, the service providing server 270A receives the entry trigger from the bot server 250A to know that the user enters a chat room of an online channel. The service providing server 270A infers user context suitable information required for the user at the present time, user's information of interest, and information that the user wants to know based on an inference logic. The inference logic may extract user context suitable information according to a service flow provided from the channel, a user activity history, user related state information, natural environment information such as weather, or social environment information and be designed in various forms for every connected channel. For example, the user context suitable information may be variety, such as visit greeting information, reservation information, payment information, delivery information, refund processing information, guide information, realtime information, or recommendation information.

The service providing server 270A interworks with the bot server 250A to provide the inferred user context suitable information to the chat room of the terminal 100A. The user context suitable information may be displayed on a chat room of the terminal 100A by means of the bot server 250A, the channel service server 230A, and the messaging server 210A. In this case a user who visit the offline place is not necessarily the same as a user who enters the online chat room. For example, when a student attends an educational institute and a guardian of the student enters a chat room of an educational institute channel, the service providing server extracts user context suitable information for the guardian based on student's attendance information.

A method for providing user context suitable information for the entry trigger by the bot server 250A may be designed in various ways depending on the bot. For example, the service providing server 270A provides event blocks including the user context suitable information to the bot server 250A. Alternatively, event blocks which provide user context suitable information are stored in the bot server 250A and the service providing server 270A selects an event block. That is, the service providing server 270A calls an event API of an event block corresponding to the determined user context suitable information. In the meantime, when the event block corresponding to user context suitable information is connected to a skill server, the bot server 250A calls the skill server to receive the user context suitable information. The skill server provides user context suitable information to be displayed in the message to the bot server 250A. Here, the skill server is a server which receives a skill request from the bot server 250A and analyzes the information included in the skill request to respond and may be included in the service providing server 270A.

As described above, unlike the conventional chatbot which responds the utterance of the user to provide an event block, when the user enters the chat room, the bot server 250A provides information suitable for a user's context at a time when the user enters the chat room.

Next, an on/offline connected service which provides user context suitable information based on offline visit information will be described.

Figure 14:
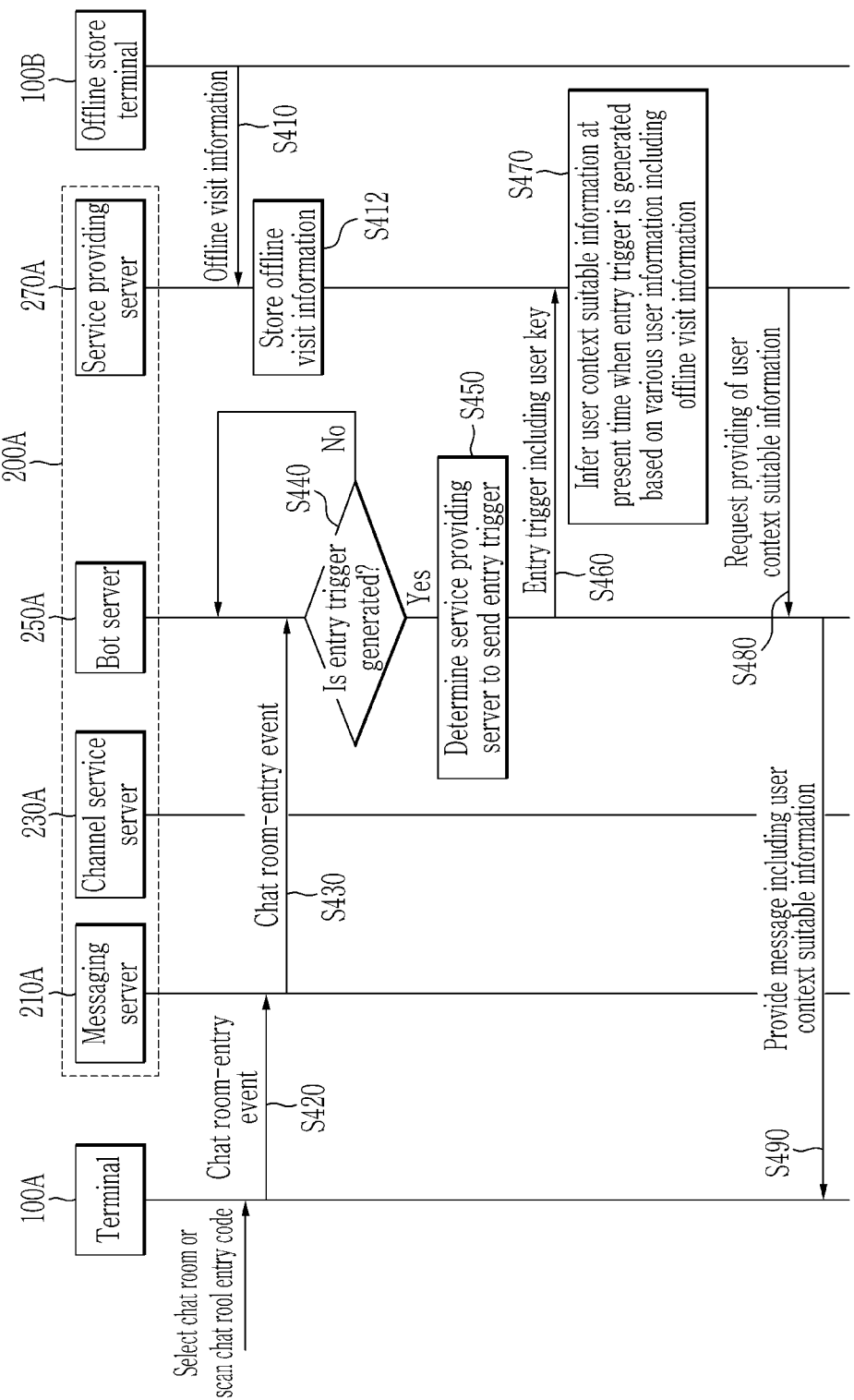
FIG. 14 is a flowchart of an information providing method according to another exemplary embodiment.

FIG. 14 is a flowchart of an information providing method according to another exemplary embodiment.

Referring to FIG. 14, the service providing server 270A collects offline visit information from an offline store terminal 100B installed in an offline place in step S410 and stores the offline visit information in step S412. When the user visits the offline place, the user visit information may be collected through the offline store terminal 100B. The offline store terminal 100B is a terminal which generates visit information of a user in the offline place and for example, may be a QR check-in terminal, a POS terminal installed in the store, and a facility entry/exit management terminal. The offline visit information includes user identification information, a visit time, a visit location, a visit purpose, visitor action information (check in, payment, order). The user identification information included in the offline visit information may be managed to be mapped to a user key managed by the application.

The terminal 100A transmits a chat room-entry event notifying the chat room entry of the user to the chat room provided by the application to the application system 200A in step S420. Here, the chat room may be a channel chat room open to communicate with customers in the channel. The chat room-entry event may include chat room information open by the selection of the user or a chat room entry address. The user may select a desired chat room from a chat room list to enter the chat room or capture the chat room-entry code 20 including the chat room entry address to enter the chat room. The chat room-entry code 20 includes an URL of the channel chat room related to the offline place and for example, may be manufactured as a QR code and position reference information (referrer) which identifies the offline place may be added to the URL. The terminal 100A scans the chat room-entry code to extract a chat room entry address and calls the chat room entry address to provide user entry information to the application system 200A.

The messaging server 210A of the application system 200A transmits a chat room-entry event to the channel service server 230A and the channel service server 230A to which a bot is connected transmits the chat room-entry event to the bot server 250A in step S430.

The bot server 250A determines whether an entry trigger for the chat room-entry event occurs based on trigger policy information in step S440. The trigger policy information may be set in various forms such as generation of entry trigger if it is a channel chat room set by using the entry trigger, generation of entry trigger if it is an entry trigger operation time, generation of entry trigger if the channel is subscribed by the user, generation of entry trigger if a cooltime has elapsed after transmitting a previous message, and generation of entry trigger if it is not no-advertisement time.

If the chat room-entry event does satisfy the trigger policy information, the bot server 250A determines a service providing server 270A to transmit the entry trigger in step S450. The bot server 250A acquires URL of the service providing server 270 related to the chat room-entry event.

The bot server 250A transmits the entry trigger including a user key to the service providing server 270A in step S460. The entry trigger includes reference information such as channel information, whether to be first visit to the chat room, time information that the user enters the chat room (entering time), and chatbot information as well as a user key that enters the chat room. The entry trigger further includes position reference information included in the chat room entry address.

The service providing server 270A checks various user information including offline visit information related to the user key of the entry trigger and infers user context suitable information at the present time when the entry trigger occurs according to the inference logic in step S470. The inference logic extracts useful information for the user at the present time based on various information such as a service flow provided by the channel, a user activity history, user related state information, various environment information (natural environment information such as weather, time information such as seasons, a month, a day of the week, and social environment information). In the meantime, when the position reference information is included in the entry trigger, the inference logic recognizes that the user currently visits the offline place corresponding to the position reference information and infers user context suitable information of the present time based on various user information including past offline visit information and offline place information. The user context suitable information may be variety, such as visit greeting information, reservation information, payment information, delivery information, refund process information, guide information, real-time information, and recommendation information.

The service providing server 270A requests the bot server 250A to provide the inferred user context suitable information in step S480.

The bot server 250A provides a message including user context suitable information to the terminal 100A through the channel service server 230A and the messaging server 210A in step S490.

Here, the method for providing the user context suitable information by the bot server 250A may be designed in various ways according to the chatbot.

For example, the service providing server 270A determines an event block corresponding to user context suitable information and calls an event API of the event block corresponding to the user context suitable information to the bot server 250A. The bot server 250A manages event blocks configured by information to be provided to the chat room and the service providing server 270A determines to provide user context suitable information to which event block.

The bot server 250A may determine whether the requested user context suitable information is information connected to the skill server and if the user context suitable information is information connected to the skill server, the bot server 250A calls the skill server to receive the user context suitable information. The skill server is a server which receives a skill request from the bot server 250A, analyzes the information included in the skill request to respond and in the present disclosure and responds the user context suitable information as a json format.

When user context suitable information is information which is not connected to the skill server, the bot server 250A provides a message (event block) corresponding to the user context suitable information to the terminal 100A, by means of the channel service server 230A and the messaging server 210A. For example, if the user context suitable information is "first visit greeting" and an event block of the "first visit greeting" is not connected to the skill server, the bot server 250A may transmit a stored first visit greeting message as a response for the entry trigger without calling the skill server. The message including the user context suitable information may be displayed in the chat room of the terminal 100A as a speech balloon.

For reference, a method for providing the user context suitable information inferred in the service providing server 270A by the bot server 250A may be designed in various ways without being limited to FIG. 2.

As described above, when the user enters the chat room, the application system 200A provides information suitable for a user context at that timing to the chat room, for example. Provides user context suitable information related to the offline place. Accordingly, the user may be immediately provided with the information that the user wants only by entering the chat room related to the offline place.

FIGS. 15 to 20 are examples of information suitable for user context based on offline visit information according to another exemplary embodiment.

Figure 15:
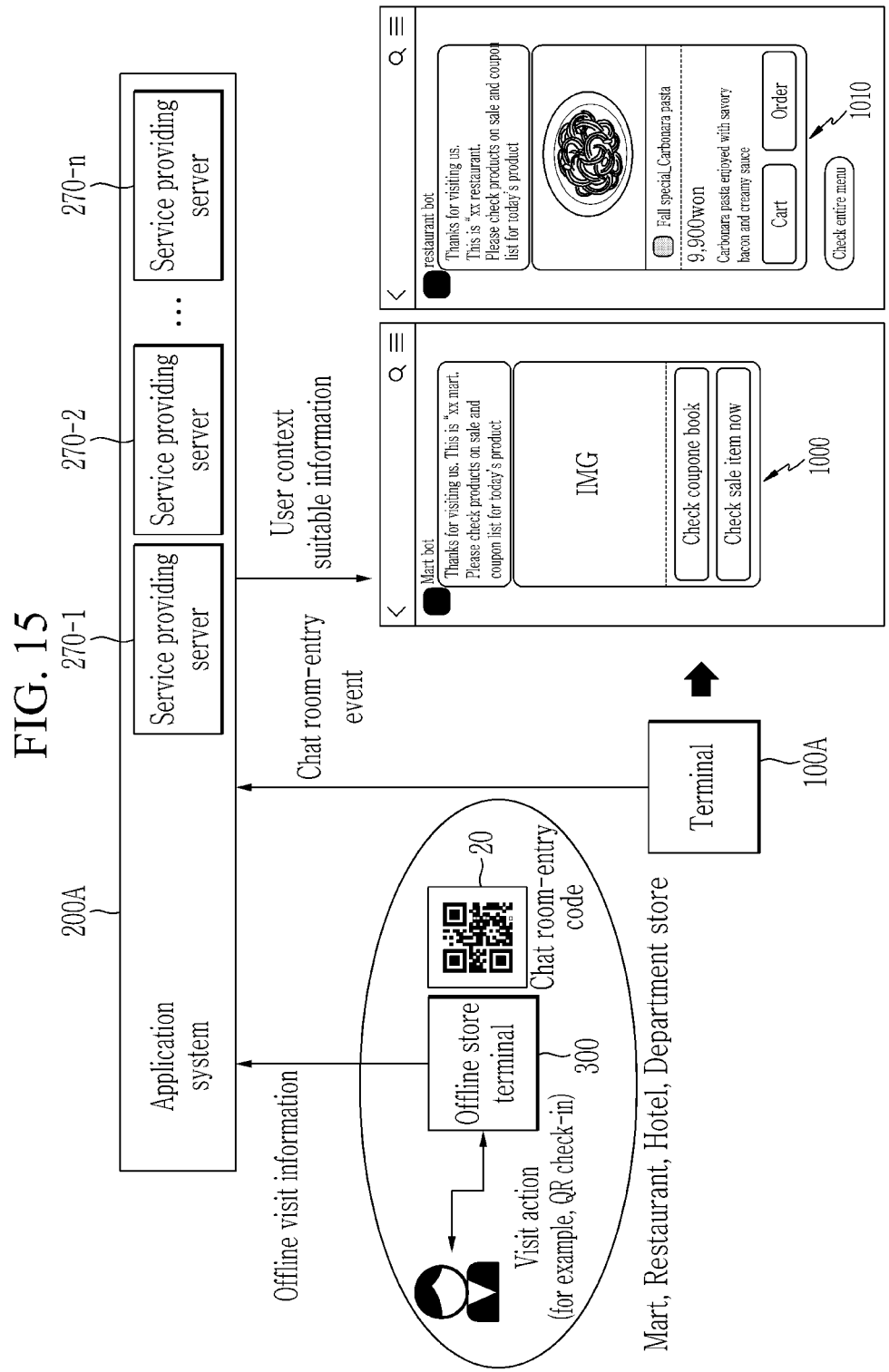

Referring to FIG. 15, visit information that visits the offline place may be collected by the offline store terminal 100B. The visit information may be generated from various visitor actions and for example, the offline visit information may be collected from the QR check-in in the offline place. The offline place may be various facilities such as marts, restaurants, hotels, department stores, and a channel is open in the application to provide an online-offline connected service by the chatbot.

Thereafter, the user may enter the chat room of a channel related to the offline place in the terminal 100A. The user may enter the chat room at a time when the user visits the offline place or enter the chat room after a predetermined time from the visit of the offline place. The user may enter the chat room by selecting a channel chat room from a chat room list screen provided from the application or capturing the chat room-entry code 20. Here, the chat room entering method through the chat room list screen is one example of entering the channel chat room and the user may check the channel chat room through various entering points.

By doing this, the terminal 100A transmits the chat room-entry event of the user to the application system 200A. The application system 200A generates an entry trigger based on the chat room-entry event generated in the terminal 100A and provides information suitable for a user context at the present time through a bot connected to the channel chat room. In this case, the user context suitable information is determined by the service providing server 270A of the channel, and selected from various event blocks according to a service flow provided from the channel, a user activity history, user related state information, natural environment information such as weather, social environment information.

The entry trigger generated based on the chat room-entry event is transmitted to the service providing server connected to the chat room and the service providing server determines the user context suitable information based on the entry trigger.

According to an exemplary embodiment, the user may enter a chat room of a channel which is operated by a xx mart, through the terminal 100A after capturing a chat room-entry code 20 disposed in the xx mart or registering visit information through the offline store terminal 100B. By doing this, the terminal 100A displays a message 1000 related to the xx mart in the chat room. The message 1000 related to the xx mart may be provided in various forms according to a time difference between the offline visit time and a chat room entering time. The service providing server 270-1 of the channel which is operated by the xx mart checks a user key of the entry trigger generated from the chat room-entry event and checks offline visit information collected in accordance with the user key, according to a recommendation logic. If the offline visit information corresponding to the user key is collected within a predetermined time (for example, 30 minutes), the service providing server 270-1 infers that the user is currently located in the xx mart and determines a message 1000 including event information which is currently being held in the xx mart as user context suitable information. When the chat room entry trigger is received after a predetermined time (for example, 2 days) since the offline visit information collecting time, the service providing server 270-1 determines a message recommending a visit to the mart together with event information/coupone information as the user context suitable information. Alternatively, when the entry trigger includes position reference information corresponding to the xx mart, the service providing server 270-1 recognizes that the user currently visits the xx mart and determines a message 1000 including event information which is currently being held in the xx mart as user context suitable information.

According to another exemplary embodiment, the user may enter the chat room of the channel which is operated by a xx restaurant, through the terminal 100A, within a predetermined time after capturing a chat room-entry code 20 disposed in the xx restaurant or registering visit information through the offline store terminal 100B. By doing this, the terminal 100A displays a message 1010 related to the xx restaurant in the chat room. The message 1010 related to the xx restaurant may be provided in various forms according to a time difference between the offline visit time and a chat room entering time. The service providing server 270-2 of the channel which is operated by the xx restaurant checks a user key of the entry trigger generated from the chat room-entry event and checks offline visit information collected in accordance with the user key according to a recommendation logic. If the entry trigger generates within a predetermined time (for example, 10 minutes) from the offline visit time, a service providing server 270-2 determines a message 1010 including a menu ordering function as user context suitable information. If the entry trigger is generated after a predetermined time (for example, 7 days) from the offline visit time and there is no reservation information, the service providing server 270-2 determines a message including a reservation function as user context suitable information. Alternatively, when the entry trigger includes position reference information corresponding to the xx restaurant, the service providing server 270-2 recognizes that the user currently visits the xx restaurant and determines menu recommendation currently useful for the user to order a menu in the store, menu order, and event information as user context suitable information.

As described above, even though the user does not input a user inquiry to the chat room, the user may be immediately provided with the information (for example, event information which is being held in the mart) about offline place that the user wants at the present time only by entering the channel chat room related to the visit offline place. In this case, the information provided to the user may be determined depending on the time difference between the recent offline visit time and the current chat room entering time.

Figure 16:
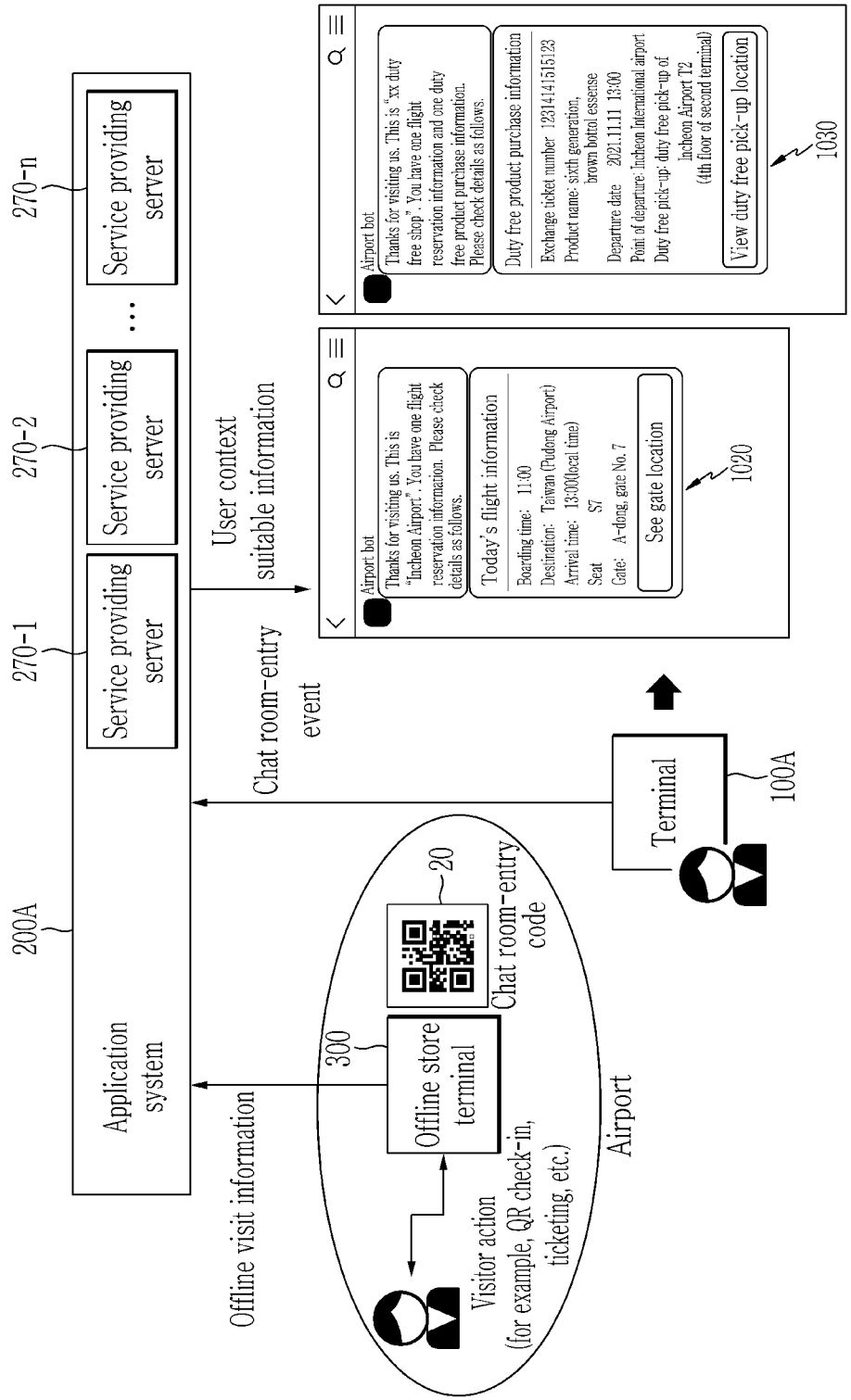

Referring to FIG. 16, when the user visits an airport, visit information is collected by the offline store terminal 100B. The visit information may be generated from various visitor actions and for example, the offline visit information may be collected from the QR check-in or ticketing in the offline place.

Thereafter, the user may enter the chat room by selecting a chat room of a channel related to the offline place (for example, an airport channel, an airline channel, a duty-free shop channel) in the terminal 100A or capturing the chat room-entry code 20. By doing this, the terminal 100A transmits the chat room-entry event of the user to the application system 200A. The application system 200A generates an entry trigger based on the chat room-entry event generated in the terminal 100A and provides information suitable for a user context at the present time through a bot connected to the channel chat room. In this case, the user context suitable information is determined by the service providing server 270-3 of the channel based on the offline visit information.

The entry trigger generated based on the chat room-entry event is transmitted to the service providing server 270-3 connected to the chat room and the service providing server 270-3 determines the user context suitable information based on the entry trigger.

The service providing server 270-3 checks a user key of the entry trigger generated from the chat room-entry event and checks offline visit information collected in accordance with the user key or position reference information included in the entry trigger, according to a recommendation logic. If the offline visit information corresponding to the user key is collected within a predetermined time (for example, 2 hours) or the position reference information is included in the entry trigger, the service providing server 270-3 infers that the user is located in the airport and determines information required for the user in the airport according to the inference logic. For example, when the service providing server 270-3 receives a chat room entry trigger within a predetermined time (for example, 2 hours) from the offline visit time or receives an entry trigger including position reference information of the airport/airline, the service providing server 270-3 checks reservation information or ticketing information corresponding to the user key and provides a message 1020 including the reservation information or the ticketing information as user context suitable information. Alternatively, when the service providing server 270-3 receives a chat room entry trigger within a predetermined time (for example, 2 hours) from the offline visit time or receives an entry trigger including position reference information of the duty-free shop, the service providing server 270-3 checks duty free shop purchase details corresponding to the user key and provides a message 1030 including the duty-free shop purchase details as user context suitable information.

As described above, even though the user who visits the airport does not input a user inquiry (for example, airline ticket information or duty free shop purchase information) to the chat room, the user may be immediately provided with the information (for example, airline ticket information or duty free shop purchase information, or an airport map) that the user wants the airport at the present time only by entering the channel chat room.

Figure 17:
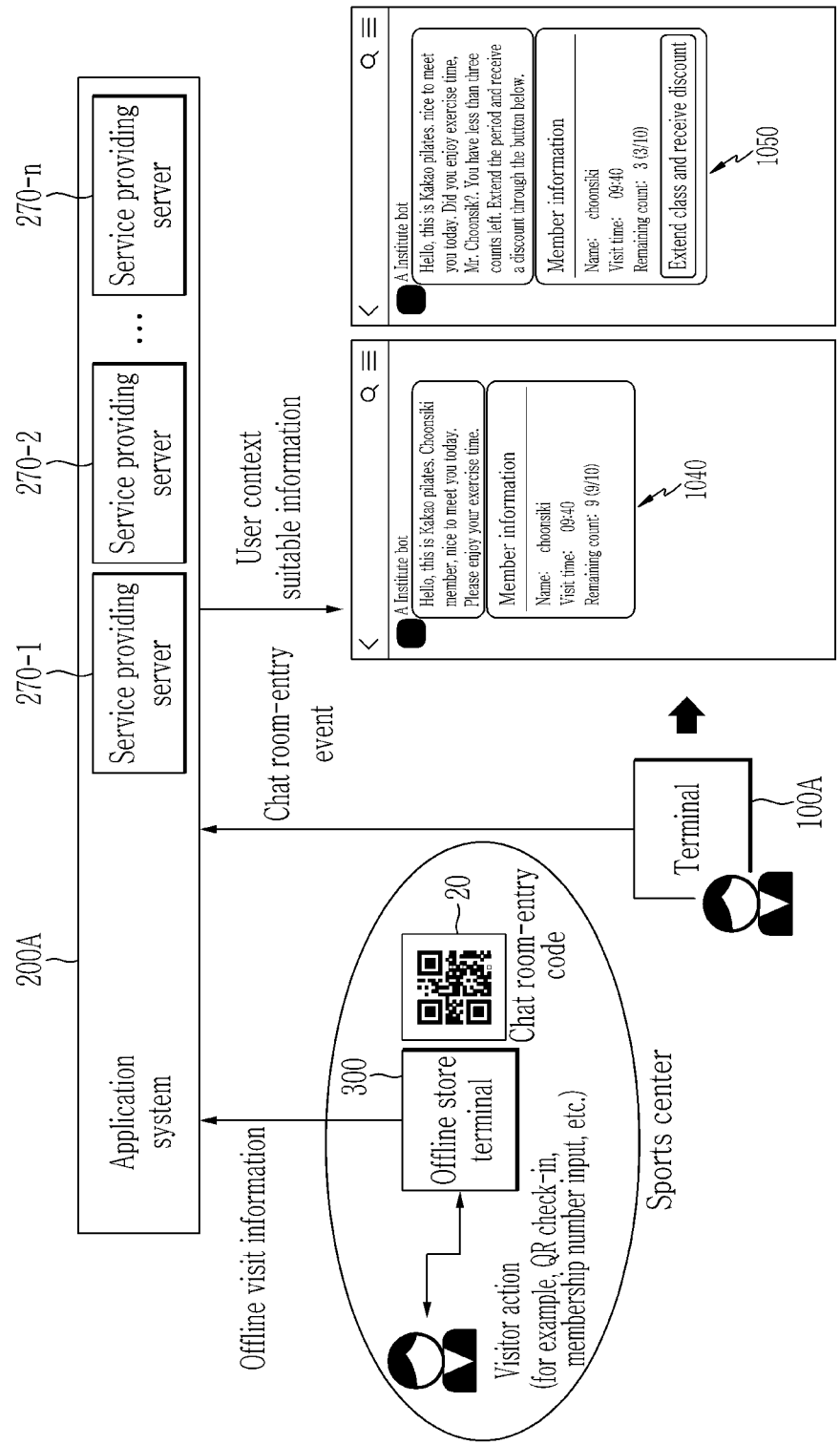

Referring to FIG. 17, when the user visits a sport center, visit information is collected by the offline store terminal 100B. The visit information may be generated from various visitor actions and for example, the offline visit information may be collected from the QR check-in or input of a membership number in the offline place.

Thereafter, the user may enter the chat room by selecting a chat room of a channel related to the offline place (for example, sports center channel) in the terminal 100A or capturing the chat room-entry code 20. By doing this, the terminal 100A transmits the chat room-entry event of the user to the application system 200A. The application system 200A generates an entry trigger based on the chat room-entry event generated in the terminal 100A and provides information suitable for a user context at the present time through a bot connected to the channel chat room. In this case, the user context suitable information is determined by a service providing server 270-4 of the channel based on the offline visit information.

The entry trigger generated based on the chat room-entry event is transmitted to the service providing server 270-4 connected to the chat room and the service providing server 270-4 determines the user context suitable information based on the entry trigger.

The service providing server 270-4 checks a user key of the entry trigger generated from the chat room-entry event and checks offline visit information collected in accordance with the user key or position reference information included in the entry trigger, according to a recommendation logic. If the offline visit information corresponding to the user key is collected within a predetermined time (for example, 30 minutes) or the position reference information is included in the entry trigger, the service providing server 270-4 infers that the user visits the sports center and determines information to be guided to the user according to the inference logic. For example, when the service providing server 270-4 receives a chat room entry trigger within a predetermined time (for example, 30 minutes) from the offline visit information collection time or receives an entry trigger including position reference information, the service providing server 270-4 checks membership information corresponding to the user key and provides a message 1040 including registered class information as user context suitable information. In this case, a remaining count recorded in the membership information is equal to or lower than a reference count (for example, three), the service providing server 270-4 may provide a message 1050 including class resign-up information as user context suitable information. When the service providing server 270-4 receives the chat room entry trigger which does not include position reference information after a long time from the offline visit information collecting time, the service providing server 270-4 determines that the user currently does not visit the sports center and provides guide information such as schedule information to sign up the class of the sports center as user context suitable information.

As described above, even though the user who visits the sports center does not input a user inquiry (for example, membership information, class resign-up information, class schedule information) to the chat room, the user may be immediately provided with the information about the sports center that the user wants at the present time only by entering the channel chat room. In this case, the information provided to the user may be determined according to a time difference between the recent offline visit time and the current chat room entering time.

Figure 18:
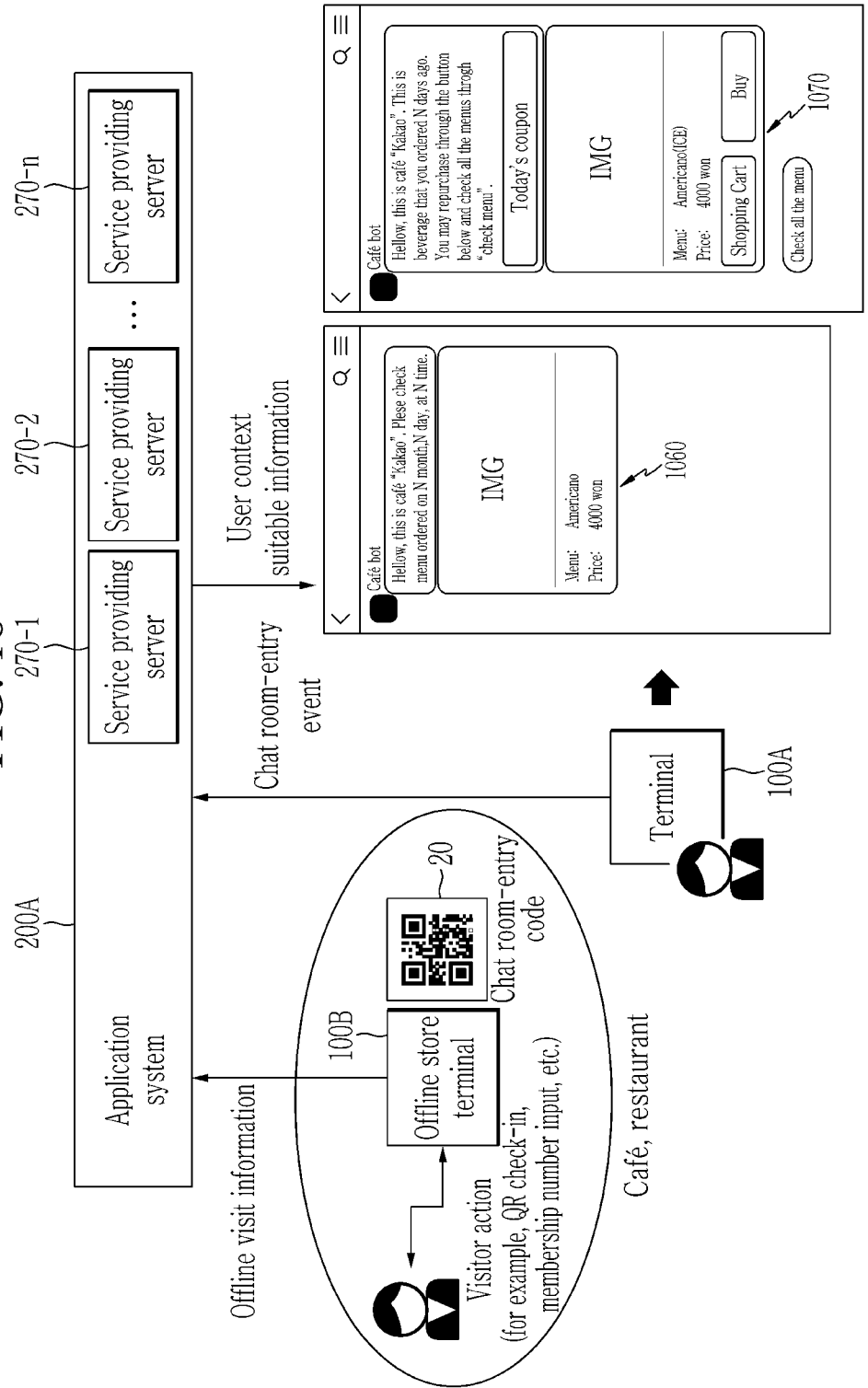

Referring to FIG. 18, when the user visits a café or a restaurant to order, visit information is collected by the offline store terminal 100B. The visit information may be generated from various visitor actions and for example, the offline visit information may be collected from the QR check-in, payment, order, or input of a membership number in the offline place.

Thereafter, the user may enter the chat room by selecting a chat room of a channel related to the offline place (for example, café kakao channel) in the terminal 100A or capturing the chat room-entry code 20. By doing this, the terminal 100A transmits the chat room-entry event of the user to the application system 200A. The application system 200A generates an entry trigger based on the chat room-entry event generated in the terminal 100A and provides information suitable for a user context at the present time through a bot connected to the channel chat room. In this case, the user context suitable information is determined by a service providing server 270-5 of the channel based on the offline visit information.

The entry trigger generated based on the chat room-entry event is transmitted to the service providing server 270-5 connected to the chat room and the service providing server 270-5 determines the user context suitable information based on the entry trigger.

The service providing server 270-5 checks a user key of the entry trigger generated from the chat room-entry event and checks offline visit information collected in accordance with the user key or position reference information included in the entry trigger, according to a recommendation logic. If the offline visit information corresponding to the user key is collected within a predetermined time (for example, 30 minutes) or the position reference information is included in the entry trigger, the service providing server 270-5 infers that the user is staying at the café kakao and determines information to be guided to the user according to the inference logic. For example, when the service providing server 270-5 receives a chat room entry trigger within a predetermined time (for example, 30 minutes) from the offline visit information collection time or receives an entry trigger including position reference information, the service providing server 270-5 checks order information corresponding to the user key and provides a message 1060 including order information as user context suitable information. If there is no order information corresponding to the user key, the service providing server 270-5 may provide a message including a menu of café kakao as user context suitable information.

When the service providing server 270-5 receives an entry trigger, the service providing server 270-5 checks offline visit time and previous user order information and determines user context suitable information based thereon. For example, when the service providing server 270-5 infers that the user is staying at the café kakao at the entry trigger receiving time, the service providing server 270-5 may provide a message 1070 including previous user order information recommendation and order function as user context suitable information.

In the meantime, a time when the service providing server 270-5 has received an entry trigger which does not include position reference information may be after a predetermined period from the recent offline visit time. By doing this, the service providing server 270-5 provides a message recommending to visit the café kakao, latest menu, and event information as user context suitable information.

As described above, even though the user who visits café or restaurant does not input a user inquiry (for example, order information, menu, event information, or reservation) to the chat room, the user may be immediately provided with the information about the café or restaurant that the user wants at the present time only by entering the channel chat room. In this case, the information provided to the user may be determined according to a time difference between the recent offline visit time and the current chat room entering time.

Figure 19:
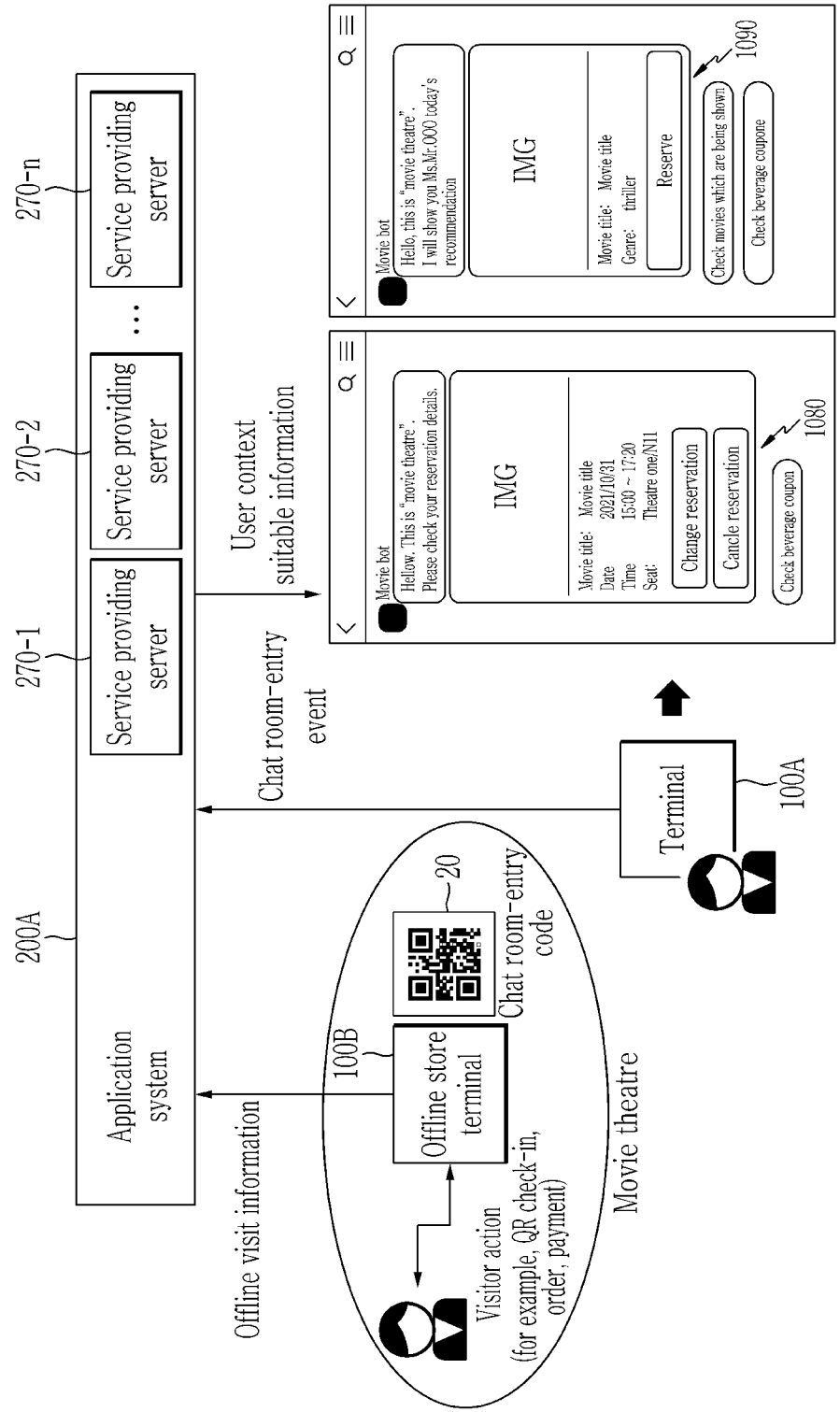

Referring to FIG. 19, when a user visits a movie theater, the visit information may be collected by the offline store terminal 100B. The visit information may be generated from various visitor's actions and for example, the offline visit information may be collected from QR check-in and payment in the offline place.

Thereafter, the user may enter the chat room by selecting a chat room of a channel (for example, a movie theatre) related to the offline place in the terminal 100A or capturing the chat room-entry code 20. By doing this, the terminal 100A transmits the user's chat room-entry event to the application system 200A. The application system 200A generates an entry trigger based on the chat room-entry event generated in the terminal 100A and provides information suitable for a user context at the present time through a bot connected to the channel chat room. In this case, the user context suitable information is determined by the service providing server 270-6 of the channel based on the offline visit information.

The entry trigger generated based on the chat room-entry event is transmitted to the service providing server 270-6 connected to the chat room and the service providing server 270-6 determines the user context suitable information based on the entry trigger.

The service providing server 270-6 checks the user key of the entry trigger generated from the chat room-entry event and checks the offline visit information collected corresponding to the user key or the position reference information included in the entry trigger according to the recommendation logic. If the offline visit information corresponding to the user key is collected within a predetermined time (for example, 30 minutes) or the position reference information is included in the entry trigger, the service providing server 270-6 infers that the user is staying at the movie theater and determines information to be guided to the user according to the inference logic. For example, when the chat room entry trigger is received within a predetermined time (for example, 30 minutes) from the offline visit time or the entry trigger including the position reference information is received, the service providing server 270-6 checks reservation information corresponding to the user key and provides a message 1080 including the reservation information as the user context suitable information. If there is not reservation information corresponding to the user key, the service providing server 270-6 provides a message including a reservation function for a movie which is being played in the movie theater as user context suitable information. When the entry trigger receiving time is within a predetermined time after the movie ends, the service providing server 270-6 provides a message to input movie ratings or a message for providing movie related information as user context suitable information.

If the chat room entry trigger which does not include the position reference information is received, the service providing server 270-6 checks a time difference of the offline visit time and the present time and determines the user context suitable information based on the time difference. For example, if a time when the entry trigger is received is after a predetermined time from the recent offline visit, the service providing server 270-6 infers that the user enters the chat room to get movie reservation or movie information and provides a message 1090 including movie recommendation, latest movie introduction, and an offerable couple as the user context suitable information.

As described above, even though the user who visits the movie theater does not input a user inquiry (for example, reservation information or movie recommendation information) to the chat room, the user may be immediately provided with the information about the movie theater that the user wants at the present time only by entering the channel chat room. In this case, the information provided to the user may be determined depending on the time difference between the recent offline visit time and the current chat room entering time.

Referring to FIG. 20, when a student attends or is dismissed from a school or an educational institute, educational institute visit information is collected by the offline store terminal 100B. The visit information may be generated from various visitor actions and for example, the offline visit information may be collected from the QR check-in, attendance check information in the offline place.

Thereafter, a guardian of the student may enter a chat room of a channel (for example, the educational institute channel) related to the offline place in the terminal 100A. By doing this, the terminal 100A transmits the chat room-entry event of the user to the application system 200A. The application system 200A generates an entry trigger based on the chat room-entry event generated in the terminal 100A and provides information suitable for a user context at the present time to a user who is a guardian through a bot connected to the channel chat room. In this case, the user context suitable information may be extracted based on student attendance information.

The service providing server 270-7 checks a user key of the entry trigger generated from the chat room-entry event and checks offline visit information collected in accordance with the user key, according to a recommendation logic. If the offline visit information corresponding to the user key is collected within a predetermined time (for example, 30 minutes), the service providing server 270-7 determines information to be guided to the user according to the inference logic. For example, when the service providing server 270-7 receives a chat room entry trigger within a predetermined time (for example, 30 minutes) from the offline visit information collection time, the service providing server 270-7 checks attendance information/dismissal information corresponding to the user key and provides a message 1100 including the attendance information/dismissal information as user context suitable information.

When the attendance information is not searched at the entry triger receiving time, the service providing server 270-7 provides a absence notification message as user context suitable information. When the service providing server 270-7 receives the entry trigger within a predetermined time after collecting the offline visit information including attendance information, the service providing server 270-7 provides an in-class notification message as user context suitable information.

When a tuition payment deadline has arrived at the entry trigger receiving time, the service providing server 270-7 provides a tuition payment request message as user context suitable information.

In addition, when the entry trigger is received, the service providing server 270-7 checks the time difference between the educational institute visit time and the present time and determines the user context suitable information based thereon. For example, if a time when the entry trigger is received is after a predetermined period from the recent educational institute visit time, the service providing server 270-7 infers that the user enters the chat room to get educational institute information, and provides class information as user context suitable information. When the entry trigger of the guardian is received, the service providing server 270-7 checks test result information taken in the educational institute and provides the information as user context suitable information.

As described above, even though the user who sends kids to the educational institute does not input a user inquiry (for example, attendance, dismissal, or test result) to the chat room, the user may be immediately provided with the information about the educational institute information and kid information who goes to the educational institute at the present time only by entering the channel chat room. In this case, the information provided to the user may be determined according to a time difference between the recent offline visit time and the current chat room entering time.

As described above, according to the present disclosure, the user opens a channel chat room at a time when the user wants to get information to get useful information suitable for the user's current situation at the present time.

According to the present disclosure, a channel operator provides useful information to the user based on visit information collected through online or offline to increase user's satisfaction and actively communicate with the customers through a channel.

According to the present disclosure, the channel operator does not miss a user who enters the chat room with interest and sends timely messages to induce use of various services provided by the channel.

The above-described exemplary embodiment of the present disclosure is implemented not only by the apparatus and the method, but also by a program which implements a function corresponding to the configuration of the exemplary embodiment of the present disclosure or a recording medium in which the program is recorded.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An operation method of an application system, comprising:

receiving a chat room-entry event notifying that a user enters the chat room, from a terminal in which an application is installed, the chat room being provided by an instant messaging service provided by the application, generating an entry trigger including a user key of the user based on the chat room-entry event, checking user related state information mapped to the user key based on the user key included in the entry trigger, and providing user context suitable information inferred based on the user related state information, to the chat room, wherein the user context suitable information is extracted by an inference logic at a time when the entry trigger is generated, and the user context suitable information consisting of visit greeting information, reservation information, payment information, delivery information, refund processing information, guide information, realtime information, or recommendation information.

2. The operation method of claim 1, wherein in the generating of an entry trigger, the entry trigger for the chat room-entry event is variably generated according to trigger policy information.

3. The operation method of claim 2, wherein the trigger policy information includes at least one of whether to use an entry trigger, whether it is an entry trigger operation time, whether a user subscribed to a channel, and whether cooltime has elapsed.

4. The operation method of claim 1, wherein the entry trigger further includes at least one of channel information that opens the chat room, whether it is a first visit of the chat room, chat room enter time information of the user, and chatbot information.

5. The operation method of claim 1, wherein the user context suitable information is differently provided according to a user's chat room entering time.

6. The operation method of claim 1, wherein a chatbot connected to the chat room provides a message including the user context suitable information to the chat room.

7. The operation method of claim 1, wherein in the providing to the chat room, offline visit information is checked based on a user key included in the entry trigger, the offline visit information being a user's visit to an offline place which is collected by an offline store terminal in the offline place when the user visits the offline place, and user context suitable information inferred based on the offline visit information is provided to the chat room.

8. The operation method of claim 7, wherein in the providing to the chat room, the user context suitable information is determined in consideration of a time difference of a recent offline visit time and an entry trigger generating time.

9. An operation method that a terminal in which an application is installed interworks with an application system, the operation method comprising:

providing a chat room-entry event in which a user enters a chat room, to the application system, the chat room being provided by an instant messaging service provided by the application, and displaying a message received from the application system in the chat room, wherein the message includes information inferred using an entry trigger including a user key of the user generated based on the chat room-entry event, wherein the message includes user context suitable information extracted through an inference logic at a time when the entry trigger is generated, and the user context suitable information consisting of visit greeting information, reservation information, payment information, delivery information, refund processing information, guide information, realtime information, or recommendation information; and wherein information included in the message is differently provided according to a time when the user enters the chat room.

10. The operation method of claim 9, wherein the message is displayed in the chat room before receiving a user inquiry in the chat room.

11. The operation method of claim 9, wherein in the providing to the application system, a chat room entry address is extracted by scanning a chat room-entry code located in an offline place and the user entry information is provided to the application system by calling the chat room entry address.

12. An application system, comprising:
a bot server that provides a chatbot transmitting a message to a chat room provided by an instant messaging service and generates an entry trigger including a user key of the user when a chat room-entry event notifying that the user enters the chat room is received, and
a service providing server that receives the entry trigger, infers user context suitable information based on the user key included in the entry trigger, and interworks with the bot server to provide the user context suitable information to the chat room,
wherein when the entry trigger is received, the service providing server checks user related state information mapped to the user key based on the user key, and provides the user context suitable information inferred based on a state indicated by the user related state information, and
wherein the service providing server infers user context suitable information at the present time at which the entry trigger is generated, based on an inference logic; and the user context suitable information consisting of visit greeting information, reservation information, payment information, delivery information, refund processing information, guide information, realtime information, or recommendation information.

13. The application system of claim 12, wherein the bot server variably generates an entry trigger for the chat room-entry event according to trigger policy information.

14. The application system of claim 13, wherein the trigger policy information includes at least one of whether to use an entry trigger, whether it is an entry trigger operation time, whether a user subscribed to a channel, and whether cooltime has elapsed.

15. The application system of claim 12, wherein the entry trigger further includes at least one of channel information that opens the chat room, whether it is a first visit of the chat room, chat room enter time information of the user, and chatbot information.

16. The application system of claim 12, wherein when the entry trigger is received, the service providing server checks offline visit information using position reference information included in the entry trigger, the offline visit information being a user's visit to an offline place which is collected by an offline store terminal in the offline place when the user visits the offline place, and provides user context suitable information inferred based on the offline visit information to the chat room by interworking with the bot server.

* * * * *